US012097705B2

(12) United States Patent
Shimomura et al.

(10) Patent No.: US 12,097,705 B2
(45) Date of Patent: Sep. 24, 2024

(54) RECORDING DEVICE

(71) Applicant: SEIKO EPSON CORPORATION, Tokyo (JP)

(72) Inventors: Masaki Shimomura, Matsumoto (JP); Tsuyoshi Furumido, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 62 days.

(21) Appl. No.: 18/059,059

(22) Filed: Nov. 28, 2022

(65) Prior Publication Data

US 2023/0166510 A1 Jun. 1, 2023

(30) Foreign Application Priority Data

Nov. 30, 2021 (JP) ................................ 2021-194883

(51) Int. Cl.

| | |
|---|---|
| ***B41J 2/165*** | (2006.01) |
| ***B41J 11/00*** | (2006.01) |
| ***B41J 29/00*** | (2006.01) |
| *B41J 2/01* | (2006.01) |
| *B41J 25/304* | (2006.01) |

(52) U.S. Cl.

CPC ....... *B41J 2/16505* (2013.01); *B41J 2/16508* (2013.01); *B41J 2/16511* (2013.01); *B41J 2/16538* (2013.01); *B41J 2/16547* (2013.01); *B41J 11/00* (2013.01); *B41J 11/006* (2013.01); *B41J 29/00* (2013.01); *B41J 2/01* (2013.01); *B41J 2/16526* (2013.01); *B41J 25/304* (2013.01)

(58) Field of Classification Search

CPC ................ B41J 2/16505; B41J 2/16508; B41J 2/16511; B41J 2/16538; B41J 2/16547; B41J 11/00; B41J 11/006; B41J 29/00; B41J 2/01; B41J 2/16526; B41J 25/304

See application file for complete search history.

(56) References Cited

U.S. PATENT DOCUMENTS

| | | | | |
|---|---|---|---|---|
| 2012/0236061 A1* | 9/2012 | Yudasaka | ............. | B41J 2/16538 347/16 |
| 2012/0250069 A1* | 10/2012 | Uematsu | .................. | B41J 11/42 358/1.14 |
| 2021/0237449 A1 | 8/2021 | Aoki et al. | | |

FOREIGN PATENT DOCUMENTS

| | | |
|---|---|---|
| JP | 2020049788 A | 4/2020 |
| JP | 2021121488 A | 8/2021 |

* cited by examiner

*Primary Examiner* — Henok D Legesse

(74) *Attorney, Agent, or Firm* — Pramod Chintalapoodi

(57) ABSTRACT

A recording portion has a nozzle surface. A first movement portion moves the recording portion in a first direction intersecting the nozzle surface. A second movement portion moves a first maintenance portion in a second direction along the nozzle surface. The recording portion is movable to a recording position at which recording is performed on a medium, and a first retreated position where the recording portion is retreated from the recording position. The first maintenance portion is movable to a maintenance position at which maintenance of the nozzle surface is performed and a second retreated position retreated from the maintenance position. When an error occurs, a control portion causes the recording portion to retreat away from the first maintenance portion in a first direction. Then, the first maintenance portion is caused to retreat in a second direction.

15 Claims, 15 Drawing Sheets

RECORDING DEVICE

The present application is based on, and claims priority from JP Application Serial Number 2021-194883, filed Nov. 30, 2021, the disclosure of which is hereby incorporated by reference herein in its entirety.

BACKGROUND

1. Technical Field

The present disclosure relates to a recording device including a recording portion that performs recording on a medium such as paper, and a control method for the recording device.

2. Related Art

For example, JP-A-2020-49788 discloses a recording device including a head that discharges a liquid onto a medium. The recording device includes a recording portion that is movable up and down and that includes a recording head. When the recording portion is moved up and down, in the recording portion, the movement of the recording head in the third direction is guided by two guide shafts.

However, a position of the recording portion may be undefined when a jam error that the medium is jammed occurs, or a power cutoff error occurs as when a power supply plug is pulled out while the recording device is powered on. In this case, when the recording portion and the maintenance portion move for an origin searching operation, there is a problem that the maintenance portion rubs against a nozzle surface of the recording head, and the recording head and the like in the recording portion may be damaged.

SUMMARY

A recording device that solves the problem described above includes a recording portion that has a nozzle surface in which a nozzle opens and performs recording on a medium by discharging a liquid from the nozzle, a first maintenance portion that performs maintenance of the recording portion, a first movement portion that moves the recording portion in a first direction that intersects the nozzle surface, a second movement portion that moves the first maintenance portion in a second direction along the nozzle surface, and a control portion that controls operations of the first movement portion and the second movement portion, wherein the recording portion is movable to a recording position at which recording is performed on a medium and a first retreated position where the recording portion is retreated from the recording position, the first maintenance portion is movable to a maintenance position at which maintenance is performed on the nozzle surface and a second retreated position where the first maintenance portion is retreated from the maintenance position, and the control portion causes the recording portion to retreat away from the first maintenance portion in the first direction when an error occurs, and causes the first maintenance portion to retreat in the second direction after the recording portion retreats.

A control method of a recording device that solves the problem described above is a control method of a recording device which includes a recording portion having a nozzle surface in which a nozzle opens and configured to perform recording on a medium by discharging a liquid from the nozzle, a first maintenance portion configured to perform maintenance of the recording portion, a first movement portion configured to move the recording portion in a first direction intersecting the nozzle surface to a recording position at which the recording on the medium is performed and a first retreated position where the recording portion is retreated from the recording position, and a second movement portion configured to move the first maintenance portion in a second direction along the nozzle surface to a maintenance position at which maintenance of the nozzle surface is performed and a second retreated position where the first maintenance portion is retreated from the maintenance position, wherein, when an error occurs, the recording portion is caused to retreat away from the first maintenance portion in the first direction, and the first maintenance portion is caused to retreat in the second direction after the recording portion retreats.

A control method of a recording device that solves the above problems is a control method of a recording device which includes a recording portion having a nozzle surface in which a nozzle opens and configured to perform recording on a medium by discharging a liquid from the nozzle, a first maintenance portion configured to perform maintenance of the recording portion, a second maintenance portion configured to perform the maintenance of the recording portion, the second maintenance portion being different from the first maintenance portion, a first movement portion configured to move the recording portion in a first direction intersecting the nozzle surface to a recording position at which the recording on the medium is performed and a first retreated position where the recording portion is retreated from the recording position, a second movement portion configured to move the first maintenance portion in a second direction along the nozzle surface to a maintenance position at which maintenance of the nozzle surface is performed and a second retreated position where the first maintenance portion is retreated from the maintenance position, and a third movement portion configured to move the second maintenance portion in a third direction orthogonal to the first direction and the second direction, wherein, when an error occurs, the recording portion is caused to retreat away from the first maintenance portion in the first direction, the first maintenance portion is caused to retreat in the second direction after the recording portion retreats, and the second maintenance portion is caused to retreat from a movement region of the first maintenance portion in the third direction simultaneously with retreat of the first maintenance portion.

DESCRIPTION OF EXEMPLARY EMBODIMENTS

Figure 1:
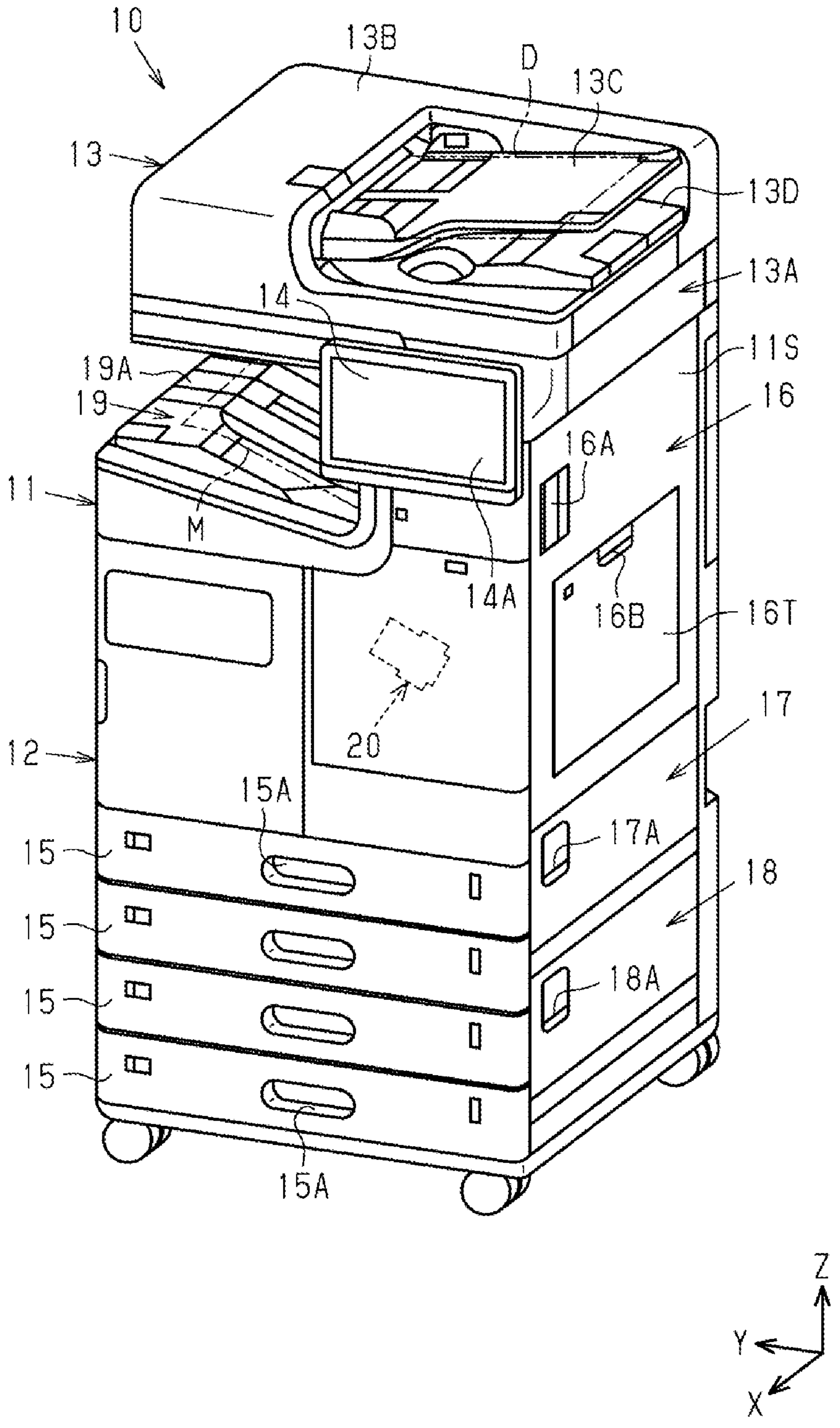
FIG. 1 is a perspective view illustrating a recording device according to an embodiment.

Embodiments will be described below with reference to the accompanying drawings. A recording device 10 is, for example, a multifunction machine. The recording device 10 has a plurality of functions including a scanning function, a copying function, and a printing function. The recording device 10 may include a facsimile function.

In the drawings, the recording device 10 is assumed to be placed on a horizontal installation surface. On a Z axis orthogonal to an installation surface of the recording device 10, the recording device 10 side with respect to an installation surface is referred to as a +Z side, the side opposite thereto is referred to as a −Z side, and two axes orthogonal to the Z axis are referred to as X and Y axes. Also, directions parallel to the X axis, Y axis, and Z axis are referred to as an X-axis direction, a Y-axis direction, and a Z-axis direction, respectively. The X-axis direction includes both a +X direction and a −X direction. The Y-axis direction includes both a +Y direction and a −Y direction. The Z-axis direction includes both a +Z direction and a −Z direction. The Z-axis direction which is a direction parallel to the Z axis is also referred to as a vertical direction Z. The X-axis direction is a depth direction when the recording device 10 is seen from the front. The X-axis direction is a width direction of a medium M, and thus the X-axis direction is also referred to as a width direction X. A front surface of the recording device 10 is a surface on the side on which an operation portion 14 operated by a user to provide an instruction to the recording device 10 is located. Further, the X axis is parallel to a direction in which a cassette 15 which will be described below is attached or detached. The X axis is parallel to the depth direction of the recording device 10. Thus, the X-axis direction is also referred to as a depth direction X.

Regarding Configuration of Recording Device 10

As illustrated in FIG. 1, the recording device 10 is, for example, a multifunction machine. The recording device 10 includes a device main body 11 that has a rectangular parallelepiped shape. The recording device 10 includes a printing portion 12 configured of the device main body 11, and an image reading portion 13 disposed on an upper portion of the printing portion 12. The device main body 11 has a transport path T (refer to FIG. 2) that transports a medium M such as paper.

The image reading portion 13 is configured to read an image of a document D. The image reading portion 13 includes a reading portion 13A which reads the document D, and an automatic document feeding portion 13B disposed above the reading portion 13A. The automatic document feeding portion 13B feeds the document D placed in a document tray 13C to the reading portion 13A. The reading portion 13A reads the document D, and discharges the document D to a discharge tray 13D after reading the document D. Furthermore, the reading portion 13A also has a flat-bed reading function of reading the document D set on a document table that is exposed when the automatic document feeding portion 13B also serving as a document table cover is opened.

The recording device 10 may include an operation portion 14 in the device main body 11. The operation portion 14 may include, for example, a display portion 14A made of a touch panel. The user can provide an instruction to the recording device 10 by performing a touch operation on the display portion 14A. The operation portion 14 may be configured to include an operation button.

The recording device 10 may include a cassette 15 capable of accommodating a plurality of media M. The cassette 15 has one stage or a plurality of stages (for example, four stages in FIG. 1). The cassette 15 is detachably attached to a lower portion of the device main body 11 by sliding in the X-axis direction. The media M having different sizes or types are accommodated in a plurality of cassettes 15, for example. The cassette 15 has a knob 15A that can be hooked with a finger when the user pulls it out.

Figure 2:
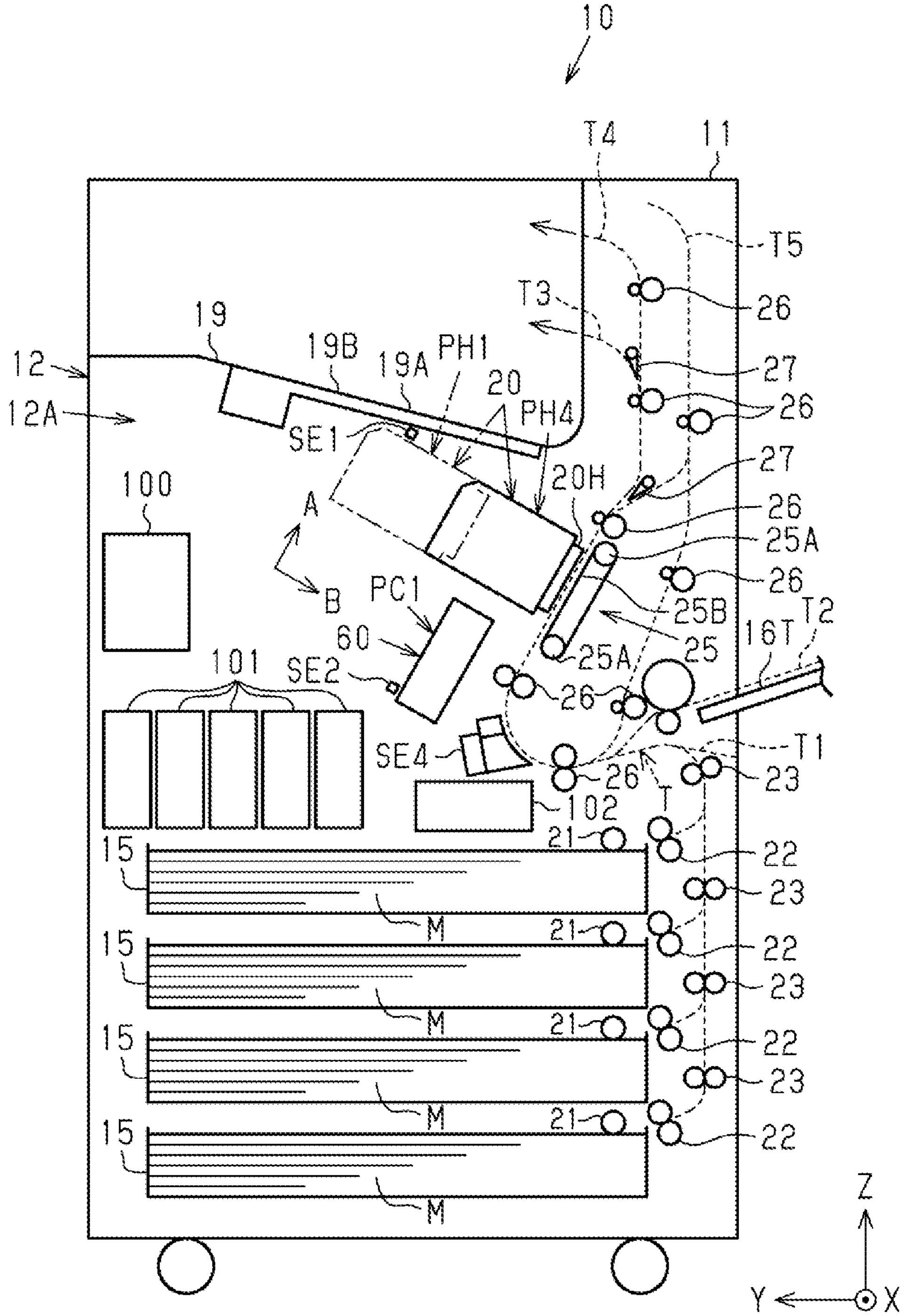
FIG. 2 is a schematic cross-sectional view illustrating an internal configuration of the recording device.

As illustrated in FIGS. 1 and 2, the device main body 11 includes a plurality of cover doors 16 to 18 on a side surface 11S thereof. The cover doors 16 to 18 can be opened and closed between a first state in which the transport path T is exposed (refer to FIG. 2) and a second state in which the transport path T is covered. The plurality of cover doors 16 to 18 include knobs 16A to 18A for the user to open and close. The first cover door 16 includes a feeding tray 16T on which the medium M can be placed. The feeding tray 16T is mounted on the first cover door 16 to be openable and closable. The feeding tray 16T has a knob 16B for the user to open and close.

As illustrated in FIG. 1, the device main body 11 includes a recording portion 20 which performs recording on the medium M (refer to FIG. 2). The recording portion 20 performs recording on the medium M fed from the cassette 15 and the medium M fed from the feeding tray 16T. A liquid reservoir 101 (refer to FIG. 2) that accommodates an ink as an example of a liquid is accommodated within the device main body 11. The recording portion 20 performs recording on the medium M using a liquid such as ink supplied from the liquid reservoir 101.

A discharge portion 19 is provided between the device main body 11 and the image reading portion 13. The discharge portion 19 includes a discharge tray 19A that constitutes a bottom portion thereof. The discharge tray 19A is a member formed to have a plate shape, and the discharged medium M (refer to FIG. 2) is loaded on the discharge tray 19A. The discharge tray 19A is inclined at a predetermined angle so that the downstream side in a discharge direction in which the recorded medium M is discharged is higher than the upstream side.

For example, a jam in which the medium M is jammed in the transport path T during printing may occur. In this case, the display portion 14A displays information about occurrence of a jam and a location at which the jam occurs. In accordance with an instruction displayed on the display portion 14A, the user opens one of the cover doors 16 to 18 corresponding to the location at which the jam occurs to expose the transport path T and performs a jam clearing task of removing the media M jammed in the transport path T. When this type of jam is detected, the recording device 10 is brought to an emergency stop. When even one of the cover doors 16 to 18 is in an open state, the recording device 10 activates an interlock. When the user who has cleared the jam closes the cover door 16 and the door sensor 90 (refer to FIG. 18) detects that all of the plurality of cover doors 16 to 18 are closed, the recording device 10 releases the interlock and is recovered to a state in which a predetermined operation including a recording operation can be performed.

Next, an internal configuration of the recording device 10 will be described with reference to FIG. 2.

The recording device 10 includes a recording mechanism 12A that constitutes the printing portion 12 in the device main body 11. The recording mechanism 12A includes a transport system mechanism that transports the medium M, a recording system mechanism that performs recording on the medium M, and a maintenance system mechanism that performs maintenance of the recording portion 20.

The recording device 10 has the transport path T in which the medium M on which recording is performed by the recording portion 20 is transported. The medium M is transported through the transport path T indicated by a dashed line in FIG. 2. An A-B coordinate system illustrated on a Y-Z plane is an orthogonal coordinate system. An A direction is a transport direction of the medium M in a region facing a recording head 20H included in the recording portion 20 in the transport path T. In the transport direction, an upstream direction is referred to as a −A direction, and a downstream direction is referred to as a +A direction. In the embodiment, the A direction is a direction that is inclined such that the +A direction is located further in the +Z direction than the −A direction. Specifically, the direction is inclined in a range of 50° to 70° with respect to a horizontal direction, and more specifically, the direction is inclined at approximately 60°. In this way, at a recording position PH4 at which recording by the recording portion 20 is performed, the transport direction of the medium M is an inclined direction that intersects both the horizontal direction and the vertical direction Z.

As illustrated in FIG. 2, the recording portion 20 moves in a B direction that is a direction toward a transport unit 25. The recording portion 20 of the embodiment reciprocates in a movement direction that is inclined by a predetermined angle with respect to a horizontal plane. The B direction is an example of a movement direction in which the recording portion 20 moves. In other words, the B direction is a movement direction in which the recording portion 20 advances and retreats with respect to the transport unit 25. In the B direction, a direction in which the recording head 20H approaches the transport path T is referred to as a +B direction, and a direction away from the transport path T is referred to as a −B direction. The −B direction is an obliquely upward direction in which the recording head 20H moves away from the transport unit 25. The B direction is a direction in which the recording portion 20 is displaced, and is a direction including a component in the Z direction that is a height direction. In the embodiment, the B direction is a direction that is inclined such that the −B direction is located further in the +Z direction than the +B direction, and is orthogonal to the A direction.

The recording portion 20 is configured to be movable between a retreated position PH1 indicated by a two-dot chain line in FIG. 2 and a recording position PH4 indicated by a solid line in FIG. 2. The retreated position PH1 is an example of a first retreated position. The recording portion 20 moves in the B direction and is movable at least to a plurality of positions including at least the retreated position PH1 and the recording position PH4. The movement direction of the recording portion 20 is a direction of movement that is accompanied by displacement of the recording portion 20 in the vertical direction Z due to the movement thereof and accompanied by up and down movements, and is also referred to as an up and down movement direction. The movement direction of the recording portion 20 is not limited to a direction that forms a predetermined angle with respect to the horizon, and may be a horizontal direction or a vertical direction Z. In the example, the B direction which is the movement direction of the recording portion 20 is also referred to as a first direction B.

In a state in which the recording portion 20 is located at the recording position PH4, the recording head 20H discharges a liquid such as ink onto a portion of the medium M supported by the transport unit 25. Thus, the recording portion 20 records information such as an image on the medium M. The recording device 10 includes a first sensor SE1 capable of detecting the recording portion 20 located at the retreated position PH1. The first sensor SE1 is configured to detect the recording portion 20 located at the retreated position PH1. The retreated position PH1 detected by the first sensor SE1 is also an origin position when a position of the recording portion 20 on a movement route is measured.

The recording device 10 has the above-described discharge portion 19, in which the medium M on which the information is recorded is discharged, at an upper portion of the device main body 11 having the rectangular parallelepiped shape. The device main body 11 has a space portion in which the medium M discharged to the discharge portion 19 can be stacked on a placement surface 19B of the discharge tray 19A. Additionally, a plurality of cassettes 15 are attachably and detachably disposed in a lower portion of the device main body 11. The plurality of cassettes 15 accommodate the medium M. The medium M accommodated in each of the plurality of cassettes 15 is transported along the transport path T by a pickup roller 21 and transport roller pairs 22 and 23. The transport path T includes a transport path T1 that extends from an external device, and a transport path T2 that extends from the feeding tray 16T provided in the device main body 11.

Also, the transport unit 25, a plurality of transport roller pairs 26, and a plurality of flaps 27 and a medium width sensor SE4 for detecting a width of the medium M in the X direction are disposed at positions along the transport path T. The transport unit 25 supports a portion of the medium M at the recording position at which the portion faces the recording portion 20, and transports the medium M. The flaps 27 have a function of switching the route through which the medium M is transported.

The transport path T forms a curved portion in a region that faces the medium width sensor SE4, and extends in the A direction in a region downstream from the curved portion. A transport path T3 and a transport path T4 directed to the discharge portion 19, and a reverse path T5 that reverses front and back surfaces of the medium M are provided downstream from the transport unit 25 in the transport path T. A discharge tray (not illustrated) is provided in the discharge portion 19 in accordance with the transport path T4. The reverse path T5 is a route in which, when double-sided recording is performed, the medium M that has finished recording on a first surface is carried in before recording on a second surface is performed. In the reverse path T5, the medium M is reversed and then sent to a position at which recording is performed, through the transport path T again in the same manner as in the recording of the first surface, and thus recording on the second surface is performed.

As illustrated in FIG. 2, the transport unit 25 supports the medium M (refer to FIG. 2) during transportation. The transport unit 25 may include two pulleys 25A, an endless transport belt 25B wound on the two pulleys 25A, and a transport motor 104 (refer to FIG. 18) that drives the pulleys 25A. The medium M is transported to a position that faces the recording portion 20 while adsorbed on a belt surface of the transport belt 25B. A known adsorption method such as an air suction method or electrostatic adsorption method can be employed as a method for adsorbing the medium M on the transport belt 25B. In this way, the transport belt 25B supports the medium M while the medium M is adsorbed thereon. The transport unit 25 is disposed to face the recording portion 20 in the B direction.

The recording portion 20 includes the recording head 20H that discharges ink that is an example of a liquid. The recording head 20H is disposed to face the transport unit 25 at the recording position in the B direction, and records information on the medium M by discharging ink from the recording head 20H. The recording portion 20 is a line head configured so that the recording head 20H that discharges ink covers the entire region of the medium M in the width direction X.

Further, the recording portion 20 performs recording in a line recording manner in which the recording can be performed in the entire region of the medium M in the width direction without moving the medium M in the width direction X. However, the recording portion 20 is not limited thereto, and may be of a serial recording type in which ink is discharged while the recording portion 20 is mounted on a carriage and moves in the width direction X of the medium M. In other words, as long as the recording device 10 is configured to include the first maintenance portion 60, the recording portion 20 may use any recording method.

The recording device 10 includes the first maintenance portion 60 that performs maintenance of a nozzle surface 20N of the recording portion 20. The first maintenance portion 60 is movable to a maintenance position for performing maintenance of the recording head 20H, and a retreated position PC1 where the recording portion is retreated from the maintenance position in the −A direction. The retreated position PC1 is an example of a second retreated position. The recording portion 20 is movable to the maintenance position a predetermined distance back from the recording position PH4 on the retreated position PH1 side. The first maintenance portion 60 performs maintenance of the recording head 20H located at the maintenance position. The first maintenance portion 60 is configured to be movable between the retreated position PC1 and the maintenance position by moving in the A direction. The first maintenance portion 60 moves from the retreated position PC1 in the A direction (the +A direction) and performs maintenance of the recording head 20H at the maintenance position. When the recording device 10 is in the recording operation, the first maintenance portion 60 waits at the retreated position PC1. In the example, the A direction which is a movement direction of the first maintenance portion 60 is also referred to as a second direction A.

The recording device 10 includes a second sensor SE2 capable of detecting the first maintenance portion 60 located at the retreated position PC1. The second sensor SE2 is configured to detect the first maintenance portion 60 located at the retreated position PC1. The first maintenance portion 60 is detected by the second sensor SE2 by retreating from a capping position PC2, which is the maintenance position, in the −A direction. The retreated position PC1 detected by the second sensor SE2 is also an origin position when a position of the first maintenance portion 60 on a movement route is measured. Details of the maintenance performed by the first maintenance portion 60 will be described below.

Additionally, in the device main body 11, the printing portion 12 includes a control portion 100 that controls an operation of each part of the recording device 10, a liquid reservoir 101 that accommodates a liquid such as ink, and a waste liquid reservoir 102 that stores a waste liquid such as ink. Further, the recording device 10 includes a feeding motor 103, a transport motor 104 (refer to FIG. 18), and the like. The liquid reservoir 101, the waste liquid reservoir 102, the feeding motor 103, and the transport motor 104 are constituents of the recording mechanism 12A.

The liquid reservoir 101 supplies ink to the recording head 20H via a tube (not illustrated). The recording head 20H discharges a liquid such as ink supplied from the liquid reservoir 101. Additionally, the pickup roller 21 illustrated in FIG. 2 is driven by the feeding motor 103. Also, the transport roller pair 22, 23, and 26 and the transport unit 25 are driven by one or more transport motors 104. The control portion 100 controls the recording device 10. The control portion 100 controls the constituents of the recording mechanism 12A based on a sense signal input from various sensors SE1 to SE4, and 55, and the like. When the recording portion 20 and the first maintenance portion 60 are not able to recognize self-positions, the control portion 100 retreat the recording portion 20 away from the first maintenance portion 60 side in the first direction B, and then, the control portion 100 performs control to retreat the first maintenance portion 60 in the second direction A. The control portion 100 detects that the recording portion 20 and the first maintenance portion 60 are located at the respective retreated positions PH1 and PC1 based on detection results of the first sensor SE1 and the second sensor SE2.

As illustrated in FIG. 2, the discharge portion 19 includes the discharge tray 19A that constitutes a bottom portion thereof. The discharge tray 19A is a member formed in a plate shape, and has a placement surface 19B on which the discharged medium M is placed. Further, the discharge tray 19A is provided downstream of the transport unit 25 in the transport path T of the medium M and at a position in the +Z direction with respect to the recording portion 20 in the Z direction. FIG. 2 illustrates each of the constituents of the recording device 10 in a simplified manner.

The control portion 100 performs an initialization operation when the recording device 10 is powered on. In the initialization operation, an origin searching operation is performed by moving the recording portion 20, the first maintenance portion 60, the second maintenance portion 80

(refer to FIG. 4) through a route passing through the retreated positions PH1, PC1, and PW1, which are respective origin positions, and searching for the retreated positions, which are origin positions on which the sensors SE1, SE2, and SE3 are turned on. Counters 111 to 113 (refer to FIG. 18) are reset at the origin positions detected in the origin searching operation. Hereinafter, in accordance with the movement of the recording portion 20, the first maintenance portion 60, and the second maintenance portion 80, each of the counters 111 to 113 counts, for example, pulse edges of detection signals from three encoders 91 to 93 (refer to FIG. 18) that detect the respective positions. Thus, each of the counters 111 to 113 counts count values that indicate the respective positions of the recording portion 20, the first maintenance portion 60, and the second maintenance portion 80.

Configuration of Motion Unit 30

Next, a configuration of a motion unit 30 is described with reference to FIG. 3.

Figure 3:
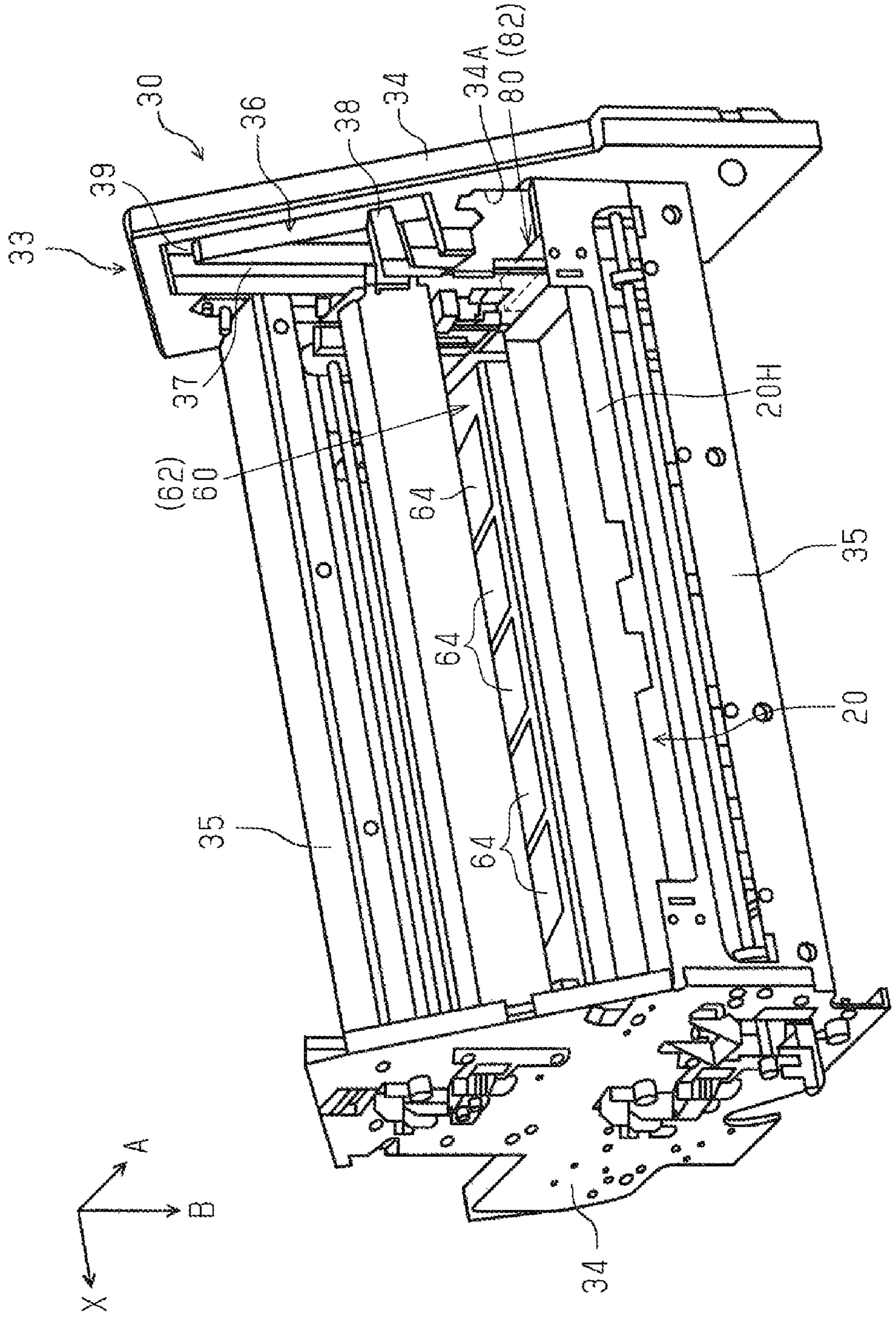
FIG. 3 is a perspective view illustrating a motion unit.

As illustrated in FIG. 3, the recording device 10 includes the motion unit 30 illustrated in FIG. 3 in the device main body 11. The motion unit 30 is a unit in which a first movement mechanism 31 (refer to FIG. 6) that moves the recording portion 20, a second movement mechanism 70 (refer to FIGS. 4 and 6) that moves the first maintenance portion 60, and a third movement mechanism 83 (refer to FIG. 11) that moves the second maintenance portion 80 are integrally assembled. The first movement mechanism 31 moves the recording portion 20 in a first direction B that intersects the nozzle surface 20N. The nozzle surface 20N is a surface that faces the transport path T in the recording head 20H.

The second movement mechanism 70 moves the first maintenance portion 60 in a second direction A along the nozzle surface 20N. The control portion 100 controls operations of the first movement mechanism 31 and the second movement mechanism 70. In the motion unit 30, the recording portion 20 is supported to be movable in the first direction B, and the first maintenance portion 60 is supported to be movable in the second direction A, and also the second maintenance portion 80 is supported to be movable in a third direction X. The second maintenance portion 80 is movable in the third direction X orthogonal to the first direction B and the second direction A, and performs maintenance of the recording head 20H of the recording portion 20. That is, the first maintenance portion 60 is movable in the second direction A and performs first maintenance with respect to the recording head 20H. The second maintenance portion 80 is movable in the third direction X and performs second maintenance different from the first maintenance with respect to the recording head 20H. In the example, the third direction X is the X-axis direction, but may be a direction other than the X-axis direction as long as the second maintenance can be performed without interfering with the first maintenance portion 60.

The motion unit 30 has a main body frame 33 that constitutes a main body portion. The main body frame 33 includes a pair of side frames 34 and 34 that face each other with a predetermined distance in the X axis direction, and a plurality of lateral frames 35 that couple between the pair of side frames 34 and 34.

As illustrated in FIG. 3, each of the pair of side frames 34 and 34 is configured as a side plate along a plane A-B. One side frame 34 is disposed on the +X direction side, and the other side frame 34 is disposed on the −X direction side. For example, a through hole 34A through which the second maintenance portion 80 moves is formed in the other side frame 34.

One guide member 36 configured to guide the recording portion 20 to move in the first direction B is assembled on each of two inner surfaces of the pair of side frames 34 and 34 that faces each other. The two guide members 36 are disposed substantially symmetrically with respect to a center of the main body frame 33 in the X direction. Thus, the guide member 36 on the −X direction side will be described, and description of the guide member 36 in the +X direction will be omitted.

As illustrated in FIG. 3, the guide member 36 includes a guide rail 37 that extends in the first direction B and guide rails 38 and 39 that branch from an intermediate portion of the guide rail 37 and extend in the Z direction. Each of the guide rails 37 to 39 is a groove type rail that opens in the +X direction, and a guide roller 29 (refer to FIG. 6) of the recording portion 20 is inserted into the groove. The guide rail 37 guides the recording portion 20 in the first direction B.

The recording portion 20 is guided by the guide rail 37 to move to one or more positions separated from the transport unit 25 with respect to the recording position. Specifically, the recording portion 20 can move along the guide rail 37 to a plurality of stop positions such as the recording position PH4, the retreated position PH1, a cap position PH3, and a flushing position.

When the recording portion 20 is located at a predetermined position on the guide rail 37, the recording portion 20 can be guided to replacement guide rails 38 and 39. In the example, the predetermined position is a retreated position PH1. In the recording device 10, an operator such as a user or a serviceman can remove the recording portion 20 from the device main body 11 for maintenance, or can replace it with a new one. When the user operates the operation portion 14 (refer to FIG. 1) to notify the recording device 10 of replacement of the recording portion 20, the control portion 100 moves the recording portion 20 to the retreated position PH1 which is also a replacement position. Thus, the operator can replace the recording portion 20 through an input port that is exposed when the discharge tray 19A is removed.

Figure 9:
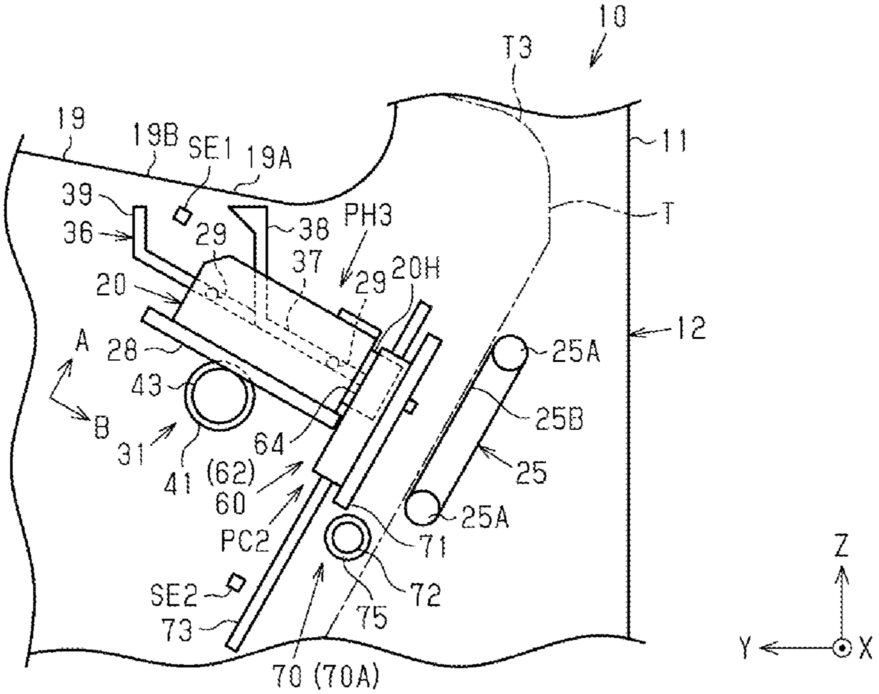
FIG. 9 is a schematic front view illustrating a situation in which the recording portion and the first maintenance portion are in a capping state.
Figure 10:
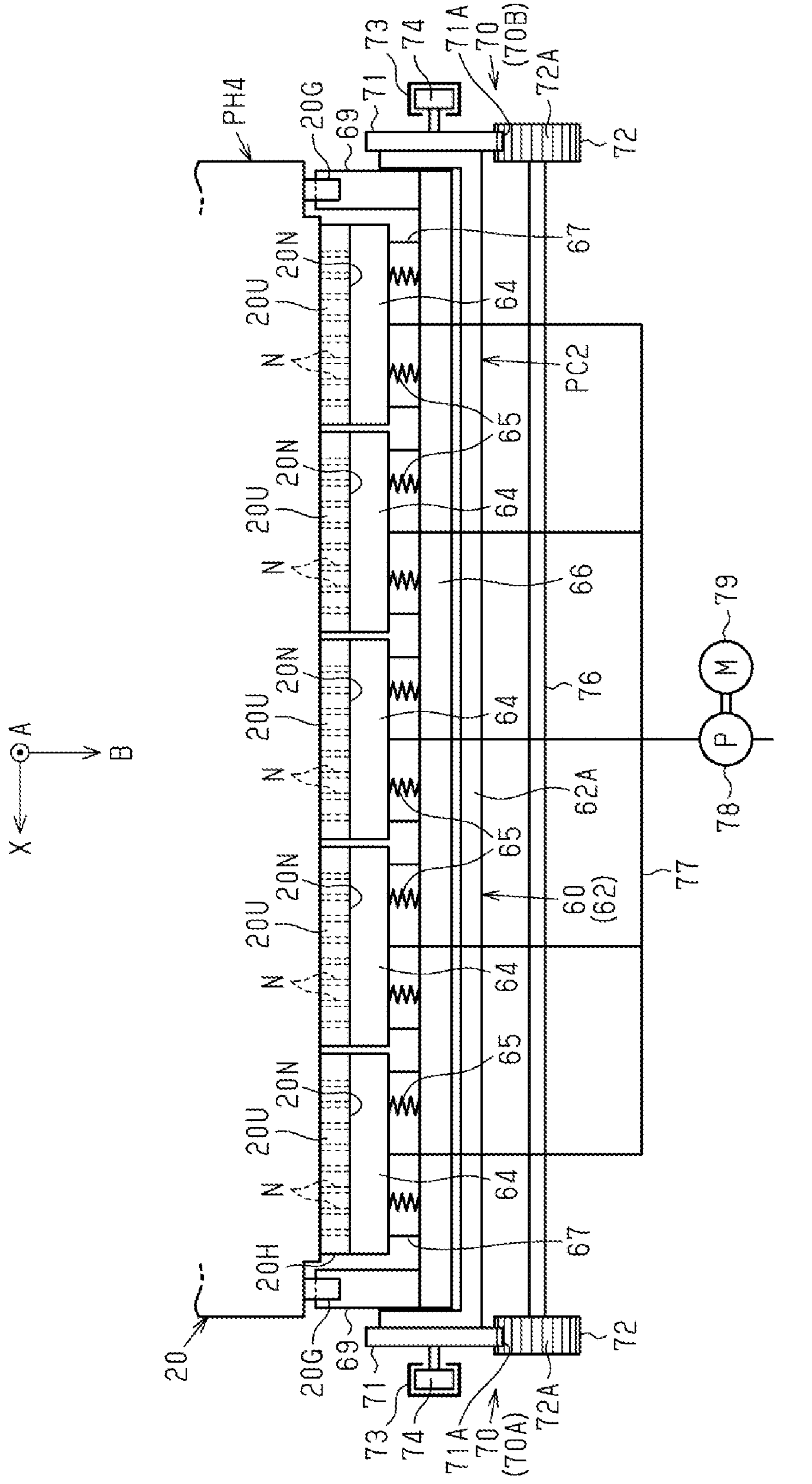
FIG. 10 is a schematic side view illustrating the recording portion and the cap portion in the capping state.

As illustrated in FIG. 3, the first maintenance portion 60 performs cleaning of the recording head 20H as the first maintenance. The first maintenance portion 60 is a cap portion 62 configured to clean the recording head 20H. The cap portion 62 of the example cleans a nozzle N (refer to FIG. 10) of the recording head 20H. The cap portion 62 has a cap 64 as an example of a contact portion illustrated in FIGS. 3 and 4. As illustrated in FIGS. 9 and 10, the cap portion 62 forcibly discharges a waste liquid such as thickening ink or ink including bubbles in the nozzle N under a capping state in contact with the recording head 20H. Thus, the nozzle N is cleaned by the cap portion 62. The cleaning prevents or eliminates clogging of the nozzle N.

As illustrated in FIG. 3, the second maintenance portion 80 is configured to perform the maintenance of the recording head 20H. The second maintenance portion 80 is a wiper portion 82 configured to wipe the nozzle surface 20N (refer to FIG. 11) of the recording head 20H as the second maintenance. The second maintenance portion 80 of the example is a wiper portion 82 including a wiper member 81 illustrated in FIGS. 4 and 11. As illustrated in FIG. 12, the wiper portion 82 wipes the nozzle surface 20N of the recording head 20H with the wiper member 81.

Figure 6:
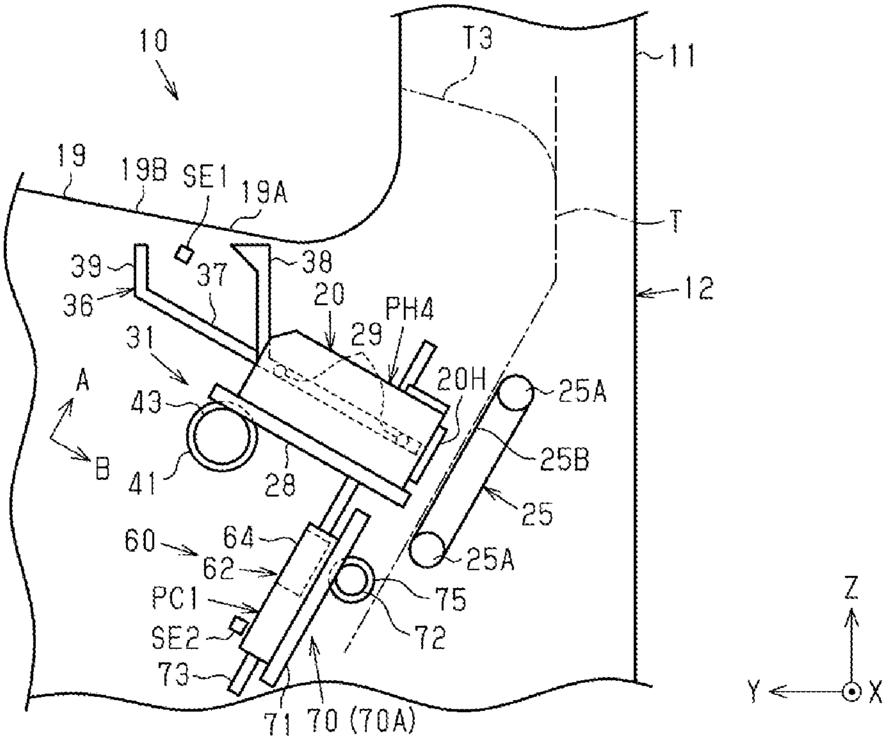
FIG. 6 is a schematic front view illustrating the recording portion and a first maintenance portion at a recording position.

As illustrated in FIGS. 3 and 6, the replacement guide rails 38 and 39 that serve as a route for removing and installing the recording portion 20 with respect to the device main body 11 are provided at the recording device 10. The recording portion 20 is removed via the replacement guide rails 38 and 39 when being located at the retreated position PH1.

The recording portion 20 of the embodiment moves up in the −B direction and moves down in the +B direction. The B direction is orthogonal to the nozzle surface 20N. In other words, a direction orthogonal to the nozzle surface 20N which is a surface of the recording head 20H in which the nozzle N (refer to FIG. 10) opens is an up and down movement direction of the recording head 20H. In the specification, a direction in which the recording portion 20 moves is also referred to as the up and down movement direction. The up and down movement direction including the −B direction and the +B direction is also referred to as an up and down movement direction ±B.

Configuration of Recording Portion 20 and Cap Portion 62

Figure 4:
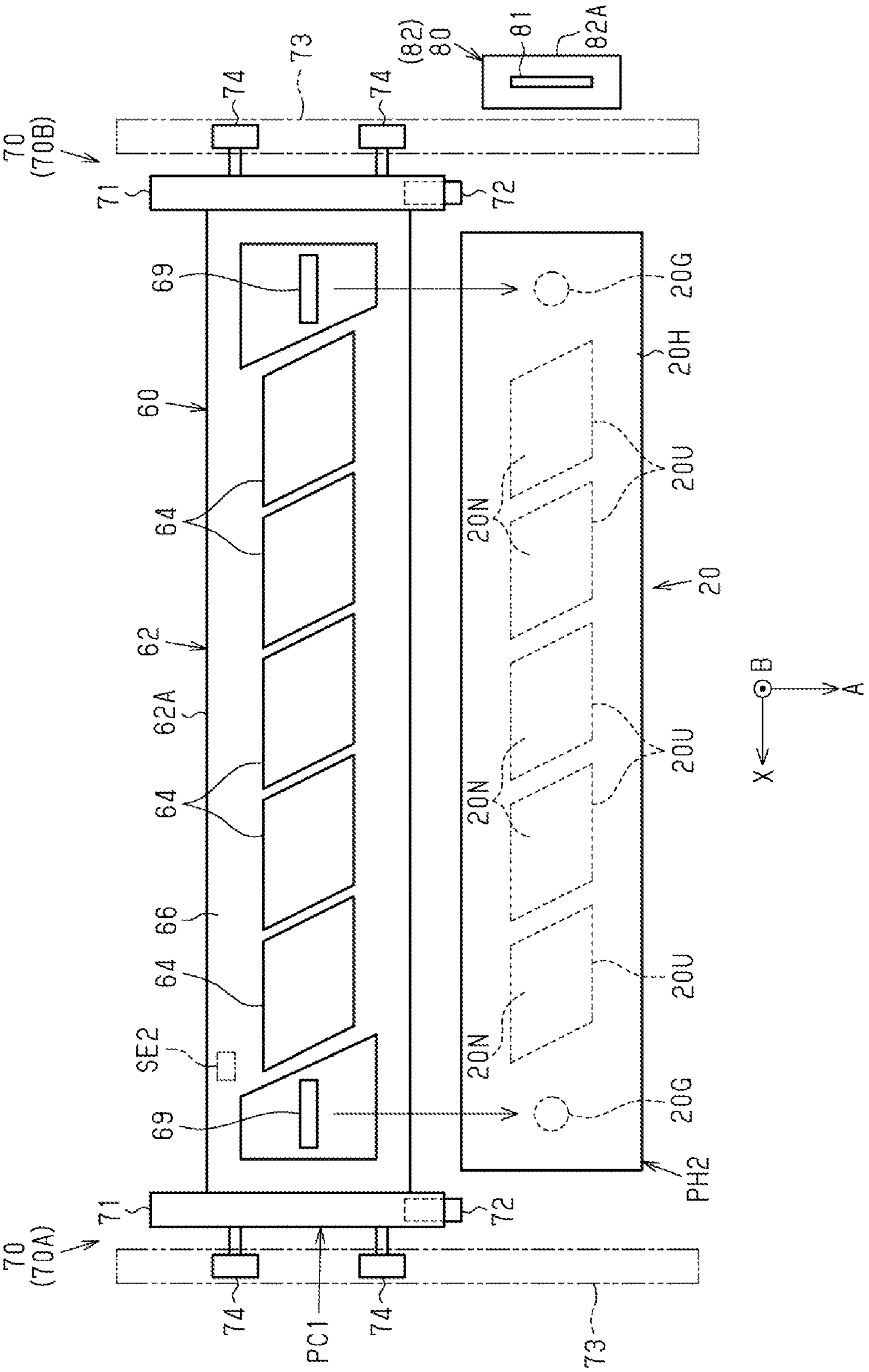
FIG. 4 is a schematic plan view of a recording portion and a cap portion in a +B direction.

Next, a configuration and operation of the recording portion 20 and the first maintenance portion 60 will be described with reference to FIG. 4. As illustrated in FIG. 4, the recording head 20H includes a plurality of unit heads 20U arranged in the X-axis direction. The cap portion 62 illustrated in FIG. 4 includes a plurality of caps 64 arranged and disposed in the X-axis direction at positions facing the plurality of unit heads 200, and a cap holder 66 that holds the plurality of caps 64. Each of the plurality of caps 64 opens on the −B direction side that faces the head 20H.

As illustrated in FIG. 4, in the cap portion 62, racks 71 fixed to both sides of the cap holder 66 in a longitudinal direction engage with pinions 72. A plurality of guide rollers 74 are installed at both side portions of the cap holder 66 in the longitudinal direction. The guide rollers 74 on both sides engage with guide rails 73 on both sides. The guide rollers 74 are rotated and guided by the guide rails 73, and thus the cap portion 62 is movable in the second direction A. The cap portion 62 located at the retreated position PC1 illustrated in FIG. 4 is detected by the second sensor SE2.

As illustrated in FIG. 4, in the cap holder 66 of the cap portion 62, a pair of engaged portions 69 for positioning are protruding at both sides of the cap holder 66 that sandwich the plurality of caps 64 in the width direction Y. The pair of engaged portions 69 protrude to a position higher than an upper surface of the cap 64 in the −B direction. In a process in which the cap portion 62 is moved from the retreated position PC1 illustrated in FIG. 4 to the capping position PC2 in the +A direction indicated by an arrow in the drawing, the pair of engaged portions 69 engage with a pair of pin portions 20G on the recording portion 20 side. Thus, the cap portion 62 is positioned at the capping position PC2 (refer to FIG. 9) in the second direction A.

As illustrated in FIG. 4, the second maintenance portion 80 is a wiper portion 82 including the wiper member 81. The wiper portion 82 includes the wiper member 81 and a slider 82A that holds the wiper member 81. The wiper portion 82 is configured to be movable in the third direction X. In a process in which the wiper portion 82 reciprocates in the third direction X, the wiper portion 82 wipes each of the nozzle surfaces 20N of the plurality of unit heads 20U with the wiper member 81.

Detailed Configuration of Recording Portion 20

Figure 5:
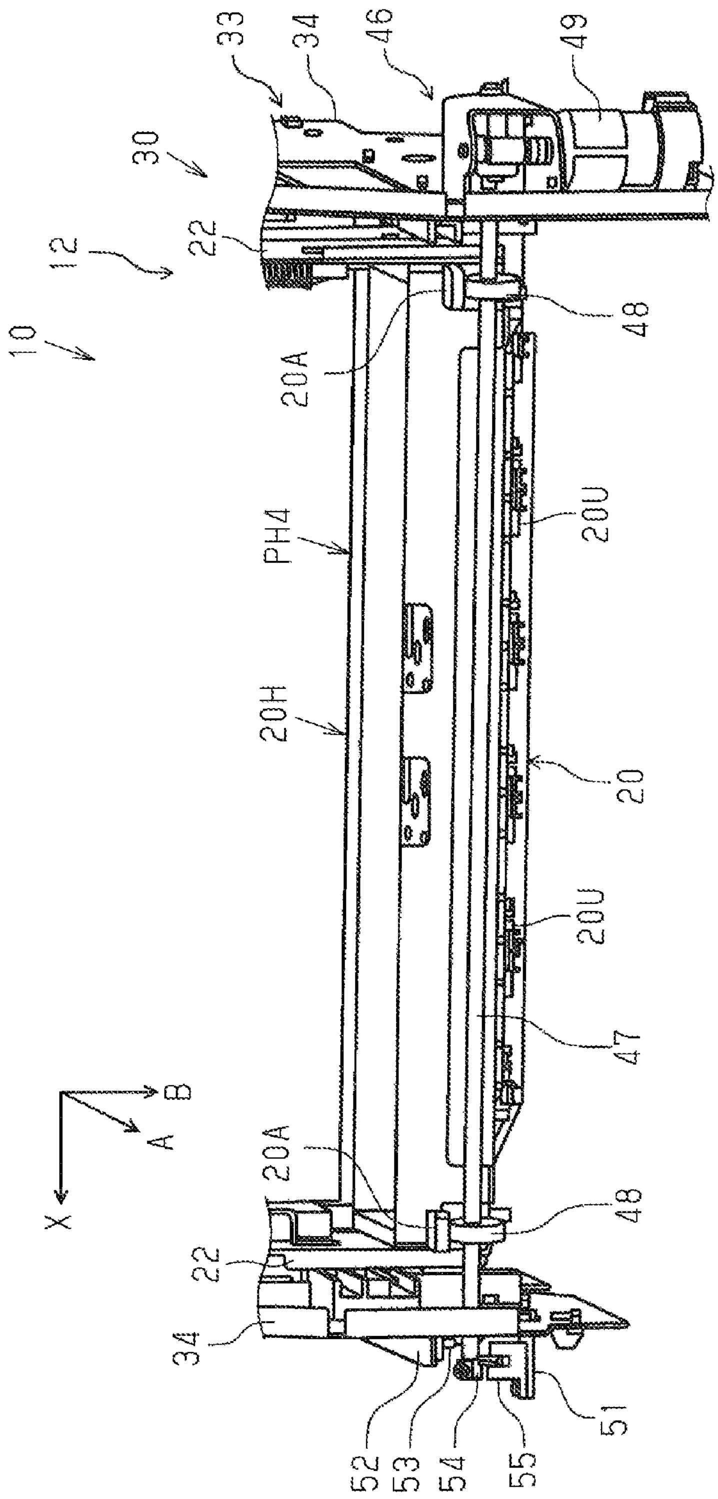
FIG. 5 is a perspective view illustrating the recording portion and an adjustment unit.

Next, a configuration of the recording portion 20 will be described with reference to FIG. 5. As illustrated in FIG. 5, an adjustment unit 46 is provided in the main body frame 33. The adjustment unit 46 includes a cam shaft 47, two eccentric cams 48, a gap adjustment motor 49, a holder 51, a bracket 52, an adjustment screw 53, a sensed member 54, and a position sensor 55. In this way, the adjustment unit 46 includes the eccentric cams 48 and the cam shaft 47 as an example of a shaft for rotating the eccentric cams 48.

As illustrated in FIG. 5, the cam shaft 47 extends across the pair of side frames 34, and is supported by the pair of side frames 34 to be rotatable via a bearing (not illustrated). The two eccentric cams 48 are installed on the cam shaft 47 at two predetermined positions. Further, outer peripheral surfaces of the two eccentric cams 48 are cam surfaces. The outer peripheral surfaces of the eccentric cams 48 come into contact with portions of a plate portion 20A of the recording portion 20 in the +B direction, and thus the recording position PH4 of the recording portion 20 is defined. Thus, the two eccentric cams 48 rotate with the rotation of the cam shaft 47, and thus the recording position PH4 of the recording head 20H is adjusted in the B direction. Additionally, the gap adjustment motor 49 rotates the cam shaft 47 in a positive direction or a reverse direction by being driven and controlled by the control portion 100 (refer to FIG. 2).

As illustrated in FIG. 5, a shaft end portion of the adjustment screw 53 supported by the bracket 52 is engaged with a screw hole of the holder 51 at an end portion of the adjustment unit 46 on the +X direction side. As the adjustment screw 53 is rotated to move the holder 51 up and down, a position of the cam shaft 47 in the B direction and a position of the recording portion 20 in the B direction can be adjusted. In the example, the position of the eccentric cam 48 in the B direction can be adjusted by a manual operation of the adjustment screw 53 by the operator.

The sensed member 54 installed at the end portion of the cam shaft 47 has a fan-shaped portion that protrudes from the cam shaft 47 in a radial direction. The position sensor 55 installed at the holder 51 is an optical sensor including a light-emitting portion and a light-receiving portion which are not illustrated, for example. The position sensor 55 detects a rotational angle of the cam shaft 47 based on the presence or absence of light blocking by the fan-shaped portion of the sensed member 54. The control portion 100 adjusts the rotational angle of the eccentric cam 48 by driving the gap adjustment motor 49 based on the rotational angle of the cam shaft 47 detected by the position sensor 55. In the embodiment, when the plate portion 20A of the recording head 20H comes into contact with the cam surface of the eccentric cam 48, the downward movement of the recording portion 20 is stopped. Thus, the recording head 20H is disposed at the recording position PH4.

The recording position PH4 of the recording portion 20 illustrated in FIG. 5 is determined according to a required gap that is an interval in the B direction between the recording portion 20 and the transport unit 25 (refer to FIG. 1). The recording position PH4 is determined according to a type of the medium M. After the rotation of the eccentric cam 48, the gap adjustment motor 49 is driven normally, the recording portion 20 moves in the B-direction, and thus the plate portion 20A comes into contact with the eccentric cam 48 and stops at the recording position PH4. At this time, an error at a stop position of the rack 28 is absorbed by a compression deformation of a spring (not illustrated). The recording portion 20 is positioned at the recording position PH4 so that a predetermined gap is ensured according to the type of the medium such as plain paper, photo paper, or the like.

In this way, the recording position PH4 in the up and down movement direction ±B of the recording head 20H is switched to a plurality of stages according to the rotational angle of the eccentric cam 48. In the embodiment, the recording position PH4 of the recording head 20H can be switched to a plurality of stages within a range of, for example, 3 to 6 stages. In the recording head 20H, the gap which is an interval in a direction in which the nozzle surface 20N and the transport unit 25 face each other is adjusted according to the recording position PH4 at that time. The recording head 20H discharges a liquid toward the medium M transported by the transport unit 25 under a state in which an appropriate gap is ensured.

Next, with reference to FIGS. 6 to 9, 13, 16, and the like, the movement routes and movement operations of the recording portion 20 and the first maintenance portion 60 will be described. In FIGS. 6 to 9, the second maintenance portion 80 is omitted.

The recording portion 20 is disposed at the recording position PH4 (FIG. 6), a standby position PH2 (FIG. 8), the cap position PH3 (FIG. 9), and the retreated position PH1 (FIGS. 2, 13, and 16) by moving in the up and down movement direction ±B along the first direction B.

The recording position PH4 illustrated in FIG. 6 is the position of the recording portion 20 when recording is performed on the medium M. The cap position PH3 is the position of the recording portion 20 when the nozzle surface 20N is covered with the cap 64. That is, the cap position PH3 is the position of the recording portion 20 when capping by the cap 64 is performed. The recording portion 20 waits in a state in which the recording portion 20 is capped with the cap 64 when recording is not performed. The standby position PH2 is located in the −B direction with respect to the cap position PH3, and the standby position PH2 is a position where the recording portion is retreated from a movement route of the cap portion 62.

The retreated position PH1 is a position when the recording portion 20 performs the origin searching operation for detecting the origin position on the movement route. The retreated position PH1 is located on the side (the −B direction side) on which the recording portion 20 moves upward from the standby position PH2. In the example, the retreated position PH1 is also the replacement position when the recording portion 20 is replaced.

As illustrated in FIG. 6, the recording device 10 includes the first movement mechanism 31 that moves the recording portion 20 in the first direction B intersecting the nozzle surface 20N. The first movement mechanism 31 is, for example, a rack and pinion mechanism. In this example, the first movement mechanism 31 is configured to include, for example, a pinion 43 (a drive gear), the rack 28, and a lift motor 41 which is a driving source that rotates the pinion 43. A length of the rack 28 is longer than a length of one round of the pinion 43. The recording portion 20 moves in the B direction via the first movement mechanism 31 by driving the lift motor 41. The recording portion 20 is guided by the guide rail 37 extending in the B direction and moves in the B direction. The first movement mechanism 31 moves the recording portion 20 up and down in the up and down movement direction ±B.

As illustrated in FIG. 6, a plurality of guide rollers 29 made of rollers are rotatably provided on a side surface of the recording portion 20. As the plurality of guide rollers 29 are guided by the guide rail 37, the recording portion 20 moves along the guide rail 37 in the first direction B.

The first maintenance portion 60 illustrated in FIG. 6 stores the recording head 20H and performs the maintenance of the recording head 20H. The first maintenance portion 60 is the cap portion 62 having the cap 64 that covers the recording head 20H. The cap 64 as the first maintenance portion 60 performs capping as the maintenance.

The first maintenance portion 60 is provided to be movable in the second direction A that intersects (for example, orthogonal to) the B direction which is the movement direction of the recording portion 20. The first maintenance portion 60 is guided by the guide rail 73 extending in the second direction A and reciprocates in the second direction A. The first maintenance portion 60 is the cap portion 62 having the cap 64 that performs the maintenance of the recording head 20H.

As illustrated in FIG. 6, the recording device 10 includes the second movement mechanism 70 that moves the first maintenance portion 60 along the nozzle surface 20N in the second direction A. The second direction A is a direction intersecting (for example, orthogonal to) the first direction B which is the movement direction of the recording portion 20. The second movement mechanism 70 is, for example, a rack and pinion mechanism 70A. The rack and pinion mechanism 70A includes a rack 71 and a pinion 72 (a drive gear), and a first slide motor 75 that is a drive source of the pinion 72. The second movement mechanism 70 moves the first maintenance portion 60 in the second direction A in which the rack 71 extends. The length of the rack 71 is longer than the length of one round of the pinion 72.

The cap portion 62 can reciprocate in the second direction A by the second movement mechanism 70. The cap portion 62 moves to the retreated position PC1 illustrated in FIG. 6, and the capping position PC2 illustrated in FIGS. 8 and 9 in which the cap portion 62 faces the recording head 20H. The retreated position PC1 is a position at which the cap portion 62 waits when the recording portion 20 is in recording. The capping position PC2 is a position of the cap portion 62 when the capping that covers the nozzle surface 20N of the recording head 20H is performed.

Figure 7:
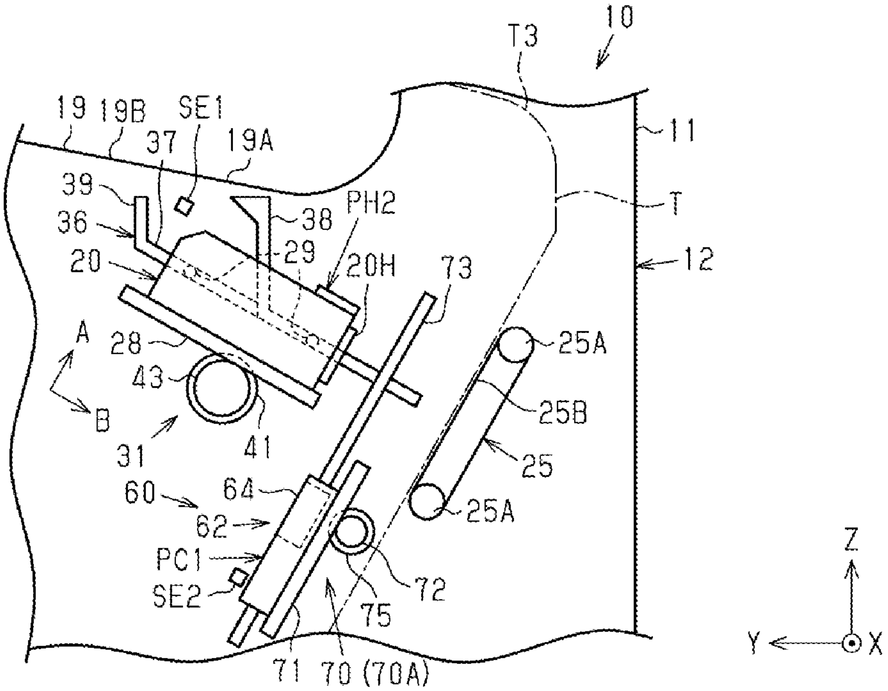
FIG. 7 is a schematic front view illustrating the recording portion and the first maintenance portion at a standby position.

When capping is performed, as illustrated in FIG. 7, in order to ensure the movement route of the cap portion 62 when the cap portion 62 moves from the retreated position PC1 to the capping position PC2, the recording portion 20 moves to the standby position PH2 where the recording portion is retreated from the recording position PH4 by a predetermined distance in the −B direction.

Figure 8:
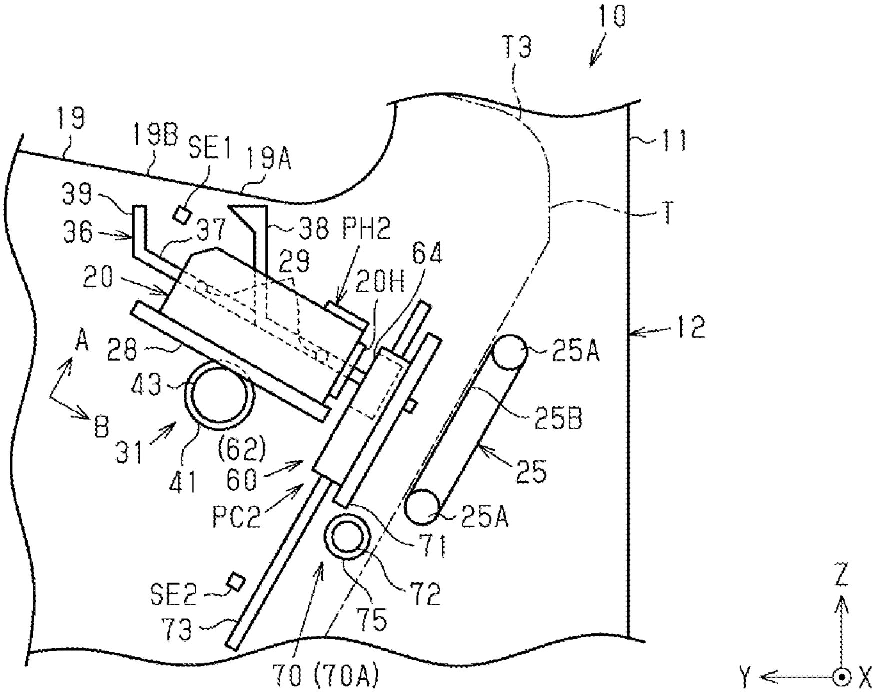
FIG. 8 is a schematic front view illustrating the recording portion at the standby position and the first maintenance portion at a capping position.

As illustrated in FIG. 8, when the recording portion 20 is located at the standby position PH2, the cap portion 62 moves in the +A direction from the retreated position PC1 illustrated in FIG. 7 to the capping position PC2 illustrated in FIG. 8. The cap 64 at the capping position PC2 faces the recording head 20H at the standby position PH2 in the +B direction. The recording portion 20 moves in the +B direction from the standby position PH2, and thus the recording head 20H and the cap 64 at the capping position PC2 come into contact with each other with a predetermined pressure. A position at which the recording head 20H comes into contact with the cap 64 is the cap position PH3 illustrated in FIG. 9. The cap 64 in the capping position PC2 is located at the cap position PH3. The cap 64 covers the nozzle N of the recording head 20H (refer to FIG. 10).

As illustrated in FIGS. 8 and 9, when the cap portion 62 is located at the capping position PC2, the cap portion 62 is separated from the transport path T in which the medium M on which recording is performed by the recording portion 20 is transported.

In a state in which the cap 64 covers the nozzle N of the recording head 20H, the maintenance of the recording head 20H is performed. The recording head 20H forcibly discharges a liquid such as ink from the nozzle N into the cap 64. In the recording device 10, the cap 64 stores the liquid forcibly discharged from the recording head 20H as the waste liquid in the waste liquid reservoir 102 illustrated in FIG. 1. A liquid such as ink discharged to the cap 64 (refer to FIG. 8) from the recording head 20H for maintenance, and a liquid such as ink discharged from the nozzle N of the recording head 20H to the cap 64 by cleaning are stored as the waste liquid in the waste liquid reservoir 102 from the cap 64.

Figure 16:
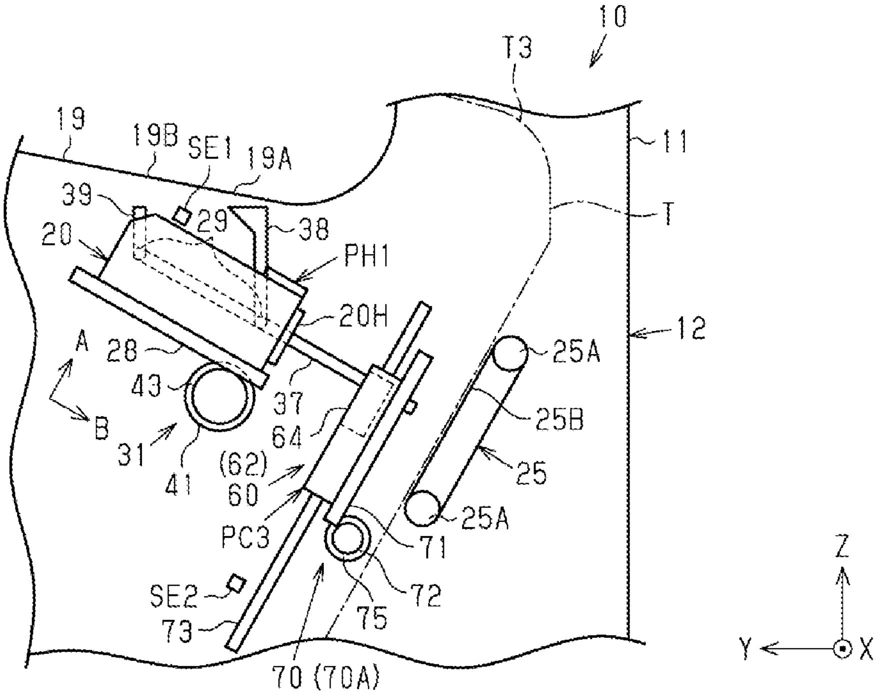
FIG. 16 is a schematic front view illustrating movement of the recording portion 20 in a recovery operation.
Figure 17:
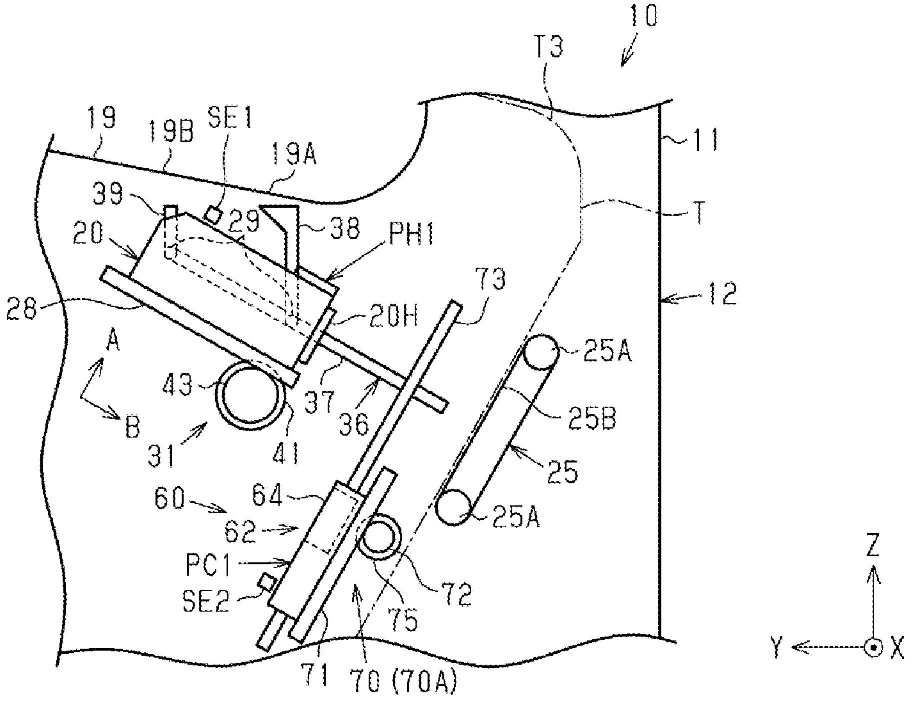
FIG. 17 is a schematic front view illustrating movement of the first maintenance portion in the recovery operation.

The recording portion 20 is disposed at the retreated position PH1 illustrated in FIGS. 16 and 17. The retreated position PH1 is also the origin position of the recording portion 20. The recording portion 20 moves to the retreated position PH1 in an initial operation and detects the origin position. The detected retreated position PH1 is an origin on the movement route of the recording portion 20. The control portion 100 grasps the position of the recording portion 20 with the retreated position PH1 of the recording portion 20 as the origin. For example, when an error such as a jam error occurs, the control portion 100 forcibly brings the recording device 10 to an emergency stop. When the error is recovered, the position of the recording portion 20 may be unidentified due to a reset process performed by the control portion 100. When the position of the recording portion 20 is unidentified, the control portion 100 moves the recording portion 20 to the retreated position PH1 which is the origin position thereof, and causes the origin searching operation for searching for an origin to be performed. That is, the control portion 100 reversely drives the lift motor 41 to move the recording portion 20 to the retreated position PH1 which is an origin of the position thereof. As illustrated in FIG. 16, in the state in which the recording portion 20 is detected by the first sensor SE1, the recording portion 20 is separated from the first maintenance portion 60 located at the capping position PC2 which is the maintenance position. In the example illustrated in FIG. 16, in the state in which the recording portion 20 is detected by the first sensor SE1, the recording portion 20 is separated from the first maintenance portion 60 when it is located at an error position PC3 slightly displaced from the capping position PC2. The control portion 100 causes the first maintenance portion 60 to retreat as illustrated in FIG. 17 after the recording portion 20 is detected by the first sensor SE1.

As illustrated in FIGS. 6, 16, and the like, the guide rails 38 and 39, and the guide rail 37 are provided. The guide rails 38 and 39 extend from the retreated position PH1 of the recording portion 20 in a direction including a component of the second direction (the A direction) that intersect the first direction (the B direction) in which the rack 28 extends. The retreated position PH1 is also the replacement position of the recording portion 20. When the recording portion 20 is located at the retreated position PH1, the plurality of guide rollers 29 are allowed to move in the vertical direction Z along the two guide rails 38 and 39, and thus the recording portion 20 can be removed from or installed in the device main body 11. When the replacement operation is performed, the discharge tray 19A is removed in order to open the input port for replacement (not illustrated).

When the discharge tray 19A is removed, the recording portion 20 can be removed or installed by moving the recording portion 20 in the vertical direction Z along the guide rails 38 and 39 from the device main body 11 through the input port (not shown) opened.

When the lift motor 41 is driven normally, the recording portion 20 moves down in the +B direction. On the other hand, when the lift motor 41 is driven reversely, the recording portion 20 moves up in the −B direction.

Also, as illustrated in FIG. 4, a plurality of guide rollers 74 made of rollers are rotatably provided on the side surface of the cap portion 62. As the plurality of guide rollers 74 are guided by the guide rail 73, the cap portion 62 moves along the guide rail 73. When a first slide motor 75 is driven normally, the cap portion 62 moves up in the +A direction. On the other hand, when the first slide motor 75 is reversely driven, the cap portion 62 moves down in the −A direction.

As illustrated in FIG. 6, the first movement mechanism 31 is a rack and pinion mechanism. The first movement mechanism 31 includes the lift motor 41 that drives the recording portion 20 in the up and down movement direction ±B. Additionally, the first movement mechanism 31 moves the recording portion 20 to one or more positions separated from the transport unit 25 with respect to the recording position PH4. Specifically, the first movement mechanism 31 is provided so that the recording portion 20 can be moved to the retreated position PH1, the standby position PH2, the cap position PH3, and the recording position PH4.

Configuration of Cap Portion 62

Next, a detailed configuration of the cap portion 62 is described with reference to FIG. 10. FIG. 10 illustrates the recording portion and the cap portion 62 in a capping state.

As illustrated in FIG. 10, the cap portion 62 includes the cap 64 that can come into contact with the nozzle surface 20N, the cap holder 66 that holds the cap 64, and a spring 65 provided between the cap 64 and the cap holder 66 as an example of a biasing portion. The spring 65 biases the cap 64 toward the nozzle surface 20N. The spring 65 biases the cap 64 in the −B direction. The cap 64 is supported by the spring 65.

In the embodiment, the recording head 20H is configured so that the plurality of unit heads 200 illustrated in FIG. 10 are arranged in the X-axis direction. The cap portion 62 illustrated in FIG. 10 includes the plurality of caps 64 arranged and disposed in the X-axis direction, which is the width direction of the medium M, at positions facing the plurality of unit heads 20U. Each of the caps 64 has an opening on the −B direction side facing the recording head 20H and has a seal portion (not shown) made of a material having rubber elasticity around the opening. When the cap 64 is pressed against the nozzle surface 20N of the unit head 200 by a biasing force of the spring 65, at least a portion of the seal portion is elastically compressed. The cap 64 is pressed on the nozzle surface 20N with a predetermined cap pressure due to a biasing force in the −B direction (the upward direction) of the spring 65 and a restoring force of the elastically compressed seal portion.

As illustrated in FIG. 10, the cap 64 has a shape and a size that can cover all of the nozzles N in the nozzle surface 20N of the unit head 20U. Further, when the cap portion 62 is located at the capping position PC2, the cap 64 is disposed at a position facing the nozzle surface 20N of each of the unit heads 200 in the first direction B. The cap 64 is brought into contact with the nozzle surface 20N of the recording head 20H at a predetermined cap pressure and thus covers a plurality of nozzles N that open to the nozzle surface 20N. Due to the cap 64 covering the nozzle surface 20N, an increase in viscosity due to drying of a liquid such as ink in the nozzle N of the recording head 20H is suppressed. When the recording portion 20 moves from the retreated position PH1 (refer to FIGS. 2, 13) to a predetermined cap position PH3 in the first direction B which is the downward movement direction, the recording head 20H and the cap 64 are brought into contact with each other at a predetermined pressure and are brought into the capping state.

The cap 64 is installed in a manner that is movable relative to the cap holder 66 in the up and down movement direction ±B via the slide portion 67. The cap 64 is biased to the cap holder 66 in the −B direction which is the upward movement direction due to the elastic force of the spring 65 interposed between a bottom surface of the cap 64 and a top surface of the cap holder 66. The spring 65 may be an elastic member such as a tension spring or a torsion coil spring as long as the cap 64 can be biased in the −B direction.

The second movement mechanism 70 includes a pair of rack and pinion mechanisms 70A and 70B. A pair of racks 71 constituting the rack and pinion mechanisms 70A and 70B are fixed on both side surfaces of the cap holder 66 in the third direction X. A pair of pinions 72 (drive gears) constituting the rack and pinion mechanisms 70A and 70B are rotatably disposed on the lower side facing tooth portions 71A of the pair of racks 71. The tooth portion 71A of the rack 71 and a tooth portion 72A of the pinion 72 are engaged with each other. The pair of pinions 72 are installed at both end portions of a rotation shaft 76. Further, the guide rollers 74 having a plurality of rollers that are rotatable with the width direction X as an axial direction are provided on both side walls of the cap portion 62 in the width direction X. The guide rollers 74 are guided along the guide rail 73 (refer to also FIG. 6) having a C-shaped cross section.

When the rotation shaft 76 rotates due to power of the first slide motor 75 (refer to FIGS. 7, 8, and the like) that is a drive source of the cap portion 62, the pair of pinions 72 rotate. When the first slide motor 75 is driven normally, the cap portion 62 moves in the +A direction via the engagement between the pinion 72 and the rack 71. On the other hand, when the first slide motor 75 is driven reversely, the cap portion 62 moves in the −A direction via the engagement between the pinion 72 and the rack 71.

Configuration of Second Maintenance Portion 80

Next, a configuration of the second maintenance portion is described with reference to FIG. 11.

Figure 11:
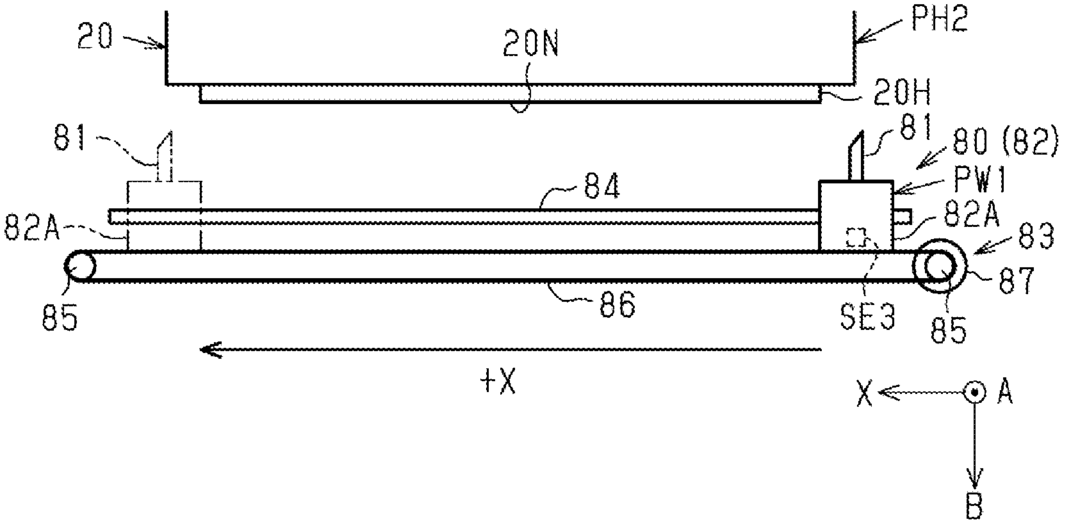
FIG. 11 is a schematic side view illustrating a configuration of a wiper portion and a wiping operation.
Figure 12:
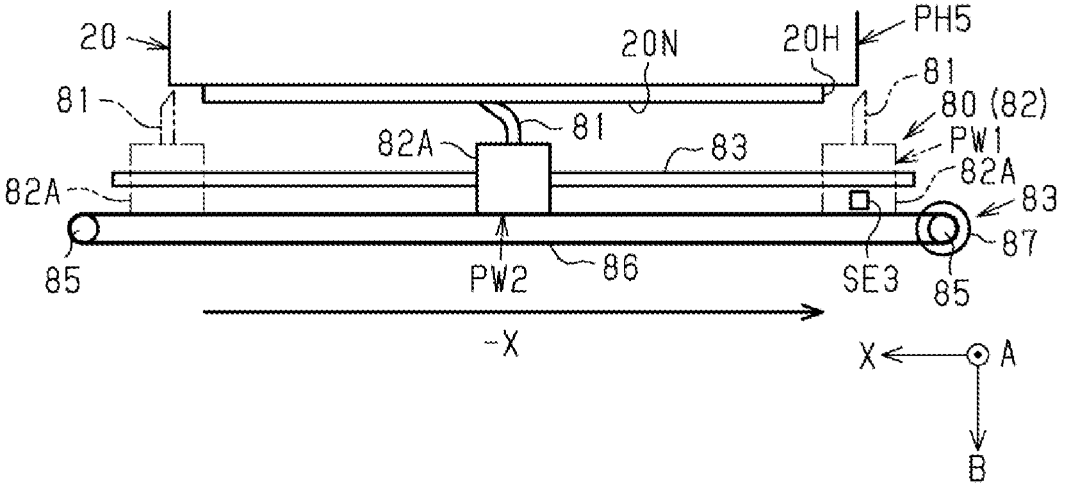
FIG. 12 is a schematic side view illustrating the wiping operation of the wiper portion.

As illustrated in FIG. 11, the second maintenance portion 80 is movable in a third direction X orthogonal to the first direction B and the second direction A and performs the maintenance of the recording head 20H of the recording portion 20. The second maintenance portion 80 is the wiper portion 82 including the wiper member 81. The wiper portion 82 includes the wiper member 81 and the slider 82A that supports the wiper member 81.

The recording device 10 includes the third movement mechanism 83 that reciprocates the wiper portion 82 in the third direction X. The third movement mechanism 83 includes a guide rail 84 that guides the slider 82A, an endless belt 86 wound around a pair of pulleys 85 and 85, and a second slide motor 87 that is a drive source for rotating one pulley 85. The guide rail 84 guides the slider 82A to be movable in the X-axis direction. The pair of pulleys 85 are disposed at positions separated from each other by a predetermined distance in the X-axis direction. The belt 86 is wound on the pair of pulleys 85 and is thus disposed in parallel with the nozzle surface 20N over a range wider than a movement region of the wiper member 81. The control portion 100 can also control the third movement mechanism 83. Specifically, the control portion 100 reciprocates the wiper member 81 on a route from a retreated position PW1 to a wiping start position by driving the second slide motor 87 normally and reversely.

The slider 82A is fixed to a portion of the belt 86. A position of the wiper portion 82 indicated by a solid line in FIG. 11 is the retreated position which is also an origin position. When wiping of the nozzle surface 20N is performed, the recording head 20H is disposed at the standby position PH2. The standby position PH2 is a position away from a movement route of the wiper member 81, and is a position at which the wiper portion 82 and the nozzle surface 20N cannot come into contact with each other. When the second slide motor 87 is driven normally in a state in which the wiper portion 82 is located at the retreated position, the wiper portion 82 moves (reciprocates) in the +X direction from the retreated position and reaches the wiping start position indicated by a two-dot chain line in FIG. 11.

After the wiper portion 82 reaches the wiping start position, the recording portion 20 moves down by a predetermined amount in the +B direction and is thus disposed at a wiping position PH5. The wiping position PH5 is located closer to the retreated position PH1 than the recording position PH4 and the cap position PH3.

The wiper portion 82 located at the wiping start position that is located at a left end in FIG. 12 moves (reciprocates) in the −X direction as the second slide motor 87 is reversely driven. In the process in which the wiper portion 82 moves in the −X direction, the wiper member 81 wipes the nozzle surface 20N. The wiper portion 82 can be positioned at a wiping position PW2 and wipes the nozzle surface 20N at the wiping position PW2.

The liquid such as ink attached to the nozzle surface 20N is caused to bend a flying direction of a liquid such as ink discharged from the nozzle N. Further, although a meniscus of a liquid such as ink is formed in the nozzle N, when a shape of the meniscus is unstable, it causes a variation in an amount of droplets discharged from the nozzle N. In the second maintenance portion 80, the liquid attached to the nozzle surface 20N is removed and the shape of the meniscus formed by the liquid in the nozzle N is aligned by wiping the nozzle surface 20N with the wiper member 81. Due to the wiper portion 82 performing the wiping operation of the nozzle surface 20N with the wiper member 81, the bending of the flying direction of the droplets discharged from the nozzle N and the variation in the amount of discharge are suppressed.

Regarding Interference Region IA

Figure 13:
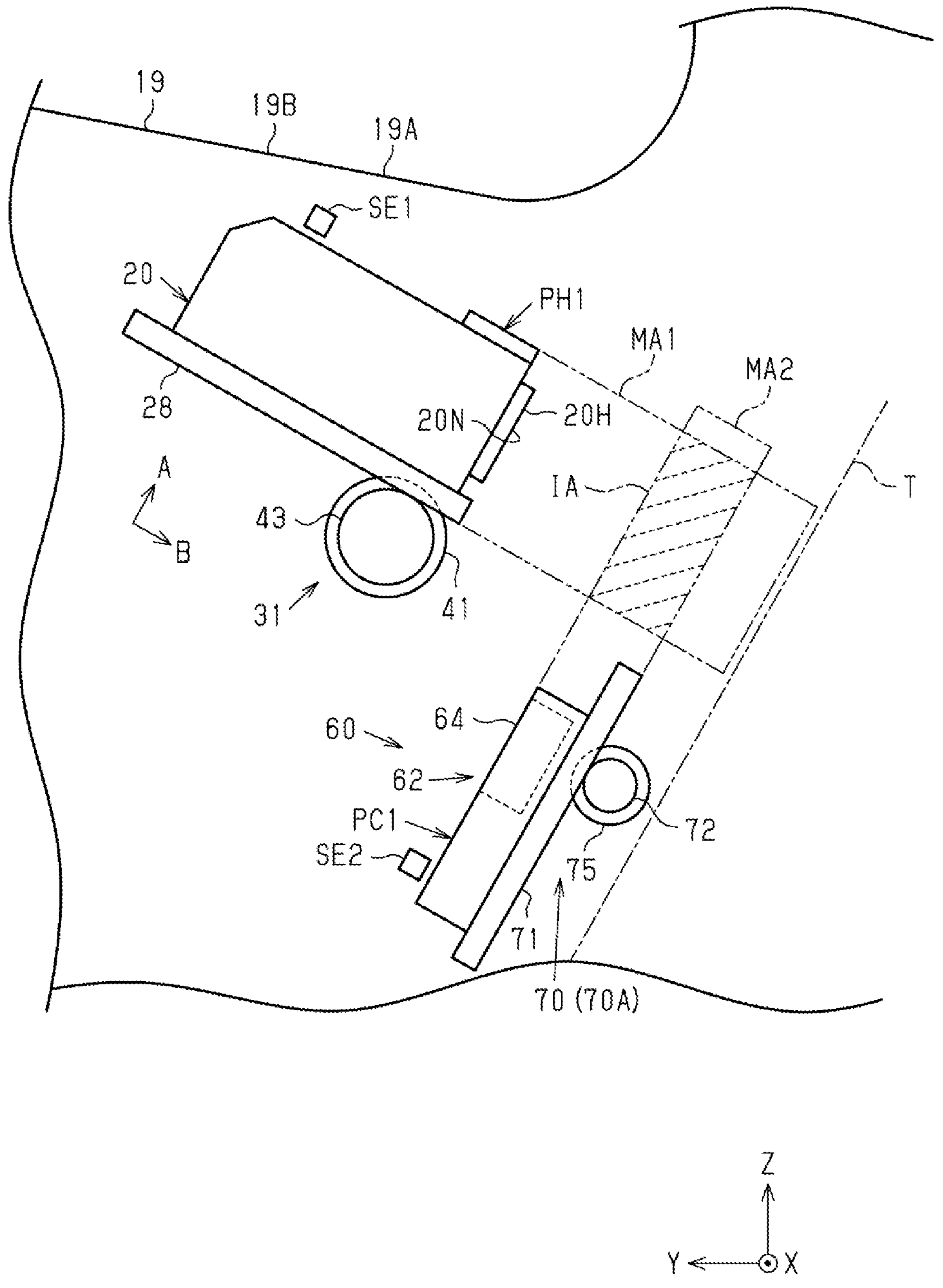
FIG. 13 is a schematic front view illustrating an interference region in which a first movement region of the recording portion and a second movement region of the first maintenance portion overlap.

Next, a positional relationship between the recording portion 20 and the first maintenance portion 60 is described with reference to FIG. 13. As illustrated in FIG. 13, a region in which the recording portion 20 is movable is referred to as a first movement region MA1, and a region in which the first maintenance portion 60 is movable is referred to as a second movement region MA2. When a region in which the first movement region MA1 and the second movement region MA2 overlap is referred to as an interference region IA (indicated in a dashed hatched region in FIG. 13), the first sensor SE1 and the second sensor SE2 detect the recording portion 20 and the first maintenance portion 60 located outside the interference region IA. That is, the first sensor SE1 detects the recording portion 20 when the recording portion 20 is located at a position other than the interference region IA, and the second sensor SE2 detects the first maintenance portion 60 when the first maintenance portion 60 is located at a position other than the interference region IA.

The first maintenance portion 60 is the cap portion 62 that comes into contact with the nozzle surface 20N and performs the capping. In the interference region IA, the first maintenance portion 60 performs the capping by coming into contact with the nozzle surface 20N approaching from the outside of the interference region IA. When the recording portion 20 is located at the standby position PH2 illustrated in FIG. 8, the recording portion 20 is outside the interference region IA illustrated in FIG. 13. The recording portion 20 waits outside the interference region IA. When the recording portion 20 moves from the standby position PH2 to the cap position PH3, the nozzle surface 20N approaches from outside the interference region IA and comes into contact with the cap 64 located at the capping position PC2. Thus, as illustrated in FIG. 9, the recording head 20H is capped. Thus, under the capping state illustrated in FIG. 9, the nozzle surface 20N and a portion or whole of the cap 64 are both located in the interference region IA illustrated in FIG. 13.

Further, as illustrated in FIG. 13, in a state in which the recording portion 20 is detected by the first sensor SE1 and the first maintenance portion 60 is detected by the second sensor SE2, the recording portion 20 is entirely outside the interference region IA, and the entire first maintenance portion 60 is outside the interference region IA. The state illustrated in FIG. 13 indicates a retreat state in which the recording portion 20 and the first maintenance portion 60 retreat to the respective retreated positions PH1 and PC1. When the recording device 10 is brought to an emergency stop due to an error such as a jam error, the control portion 100 then causes the recording portion 20, the first maintenance portion 60, and the second maintenance portion 80 (refer to FIG. 14) to retreat to the respective retreated positions PH1, PC1, and PW1 in a recovery process to recover the recording device 10 from the emergency stop state.

As illustrated in FIG. 13, when the self-positions of the recording portion 20 and the first maintenance portion 60 are detected by the first sensor SE1 and the second sensor SE2, the control portion 100 performs capping of the recording portion 20 by the cap portion 62. In other words, as illustrated in FIG. 13, in the recovery process, when the recording portion 20 and the first maintenance portion 60 are disposed at the respective retreated positions PH1 and PC1, and the respective self-positions are detected, the control portion 100 moves the cap portion 62 to the capping position PC2 and then moves the recording portion 20 to the cap position PH3. Thus, in the recovery process, the control portion 100 puts the recording head 20H into a capping state in which the recording head 20H is capped by the cap 64 as illustrated in FIGS. 9 and 10 after the origin search of each of the recording portion 20, the first maintenance portion 60, and the second maintenance portion 80.

As illustrated in FIG. 13, in the case in which the self-positions are detected by the first sensor SE1 and the second sensor SE2, even when a jam detection portion 115 determines that a jam occurs, the capping of the nozzle surface 20N with respect to the recording portion 20 is performed by the cap portion 62.

Regarding Overlapping Region OA

Figure 14:
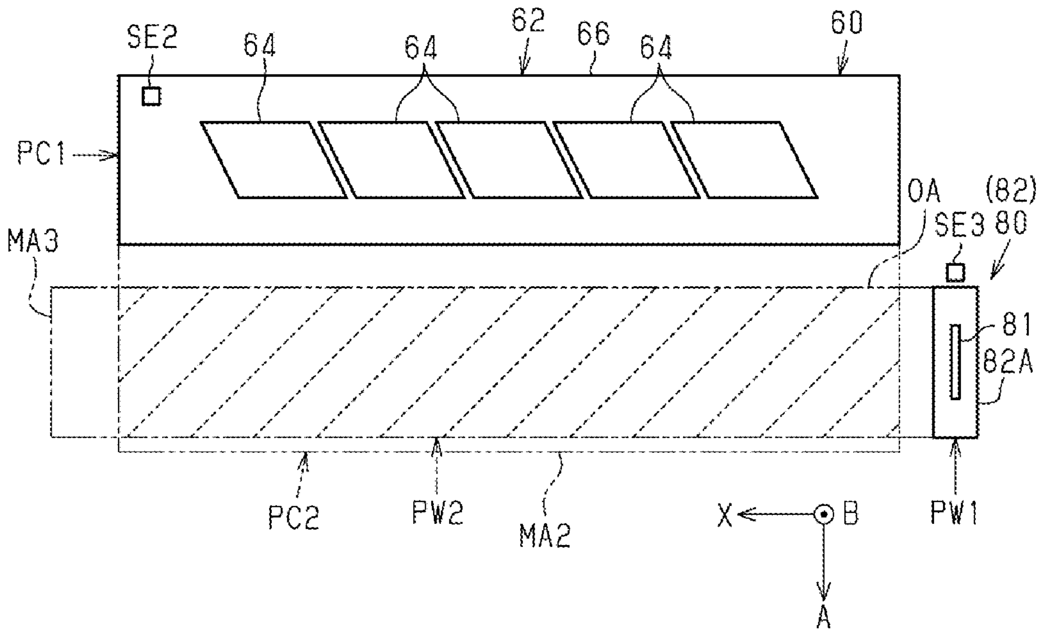
FIG. 14 is a schematic plan view illustrating an overlapping region in which the second movement region of the first maintenance portion and a third movement region of a second maintenance portion overlap.

Next, a positional relationship between the first maintenance portion 60 and the second maintenance portion 80 is described with reference to FIG. 14. As illustrated in FIG. 14, a region in which the first maintenance portion 60 is movable is referred to as a second movement region MA2, and a region in which the second maintenance portion 80 is movable is referred to as a third movement region MA3. A region in which the second movement region MA2 and the third movement region MA3 overlap is referred to as an overlapping region OA as indicated by hatching in FIG. 14.

At this time, when one of the first maintenance portion 60 and the second maintenance portion 80 performs maintenance in the overlapping region OA, the other retreats from the overlapping region OA. In other words, the first maintenance portion 60 enters the overlapping region OA when the second maintenance portion 80 is located outside the overlapping region OA. Further, the second maintenance portion 80 enters the overlapping region OA when the first maintenance portion 60 is located outside the overlapping region OA. Thus, no such control in which even portions of the first maintenance portion 60 and the second maintenance portion 80 are together in the overlapping region OA is performed.

When an error such as a jam error occurs, the control portion 100 may not be able to recognize the self-positions of the first maintenance portion 60 and the second maintenance portion 80. When the first maintenance portion 60 and the second maintenance portion 80 cannot recognize the self-positions, the control portion 100 causes the second maintenance portion 80 to retreat simultaneously with the retreat of the first maintenance portion 60. In other words, when an error occurs, and the first maintenance portion 60 and the second maintenance portion 80 cannot recognize the self-positions, the control portion 100 moves each of the first maintenance portion 60 and the second maintenance portion 80 to the respective retreated positions PC1 and PW1 to perform the origin search of each of them. At this time, the control portion 100 causes the second maintenance portion 80 to retreat simultaneously with the retreat of the first maintenance portion 60.

Recovery Operation of Recording Portion 20 and First Maintenance Portion 60

Figure 15:
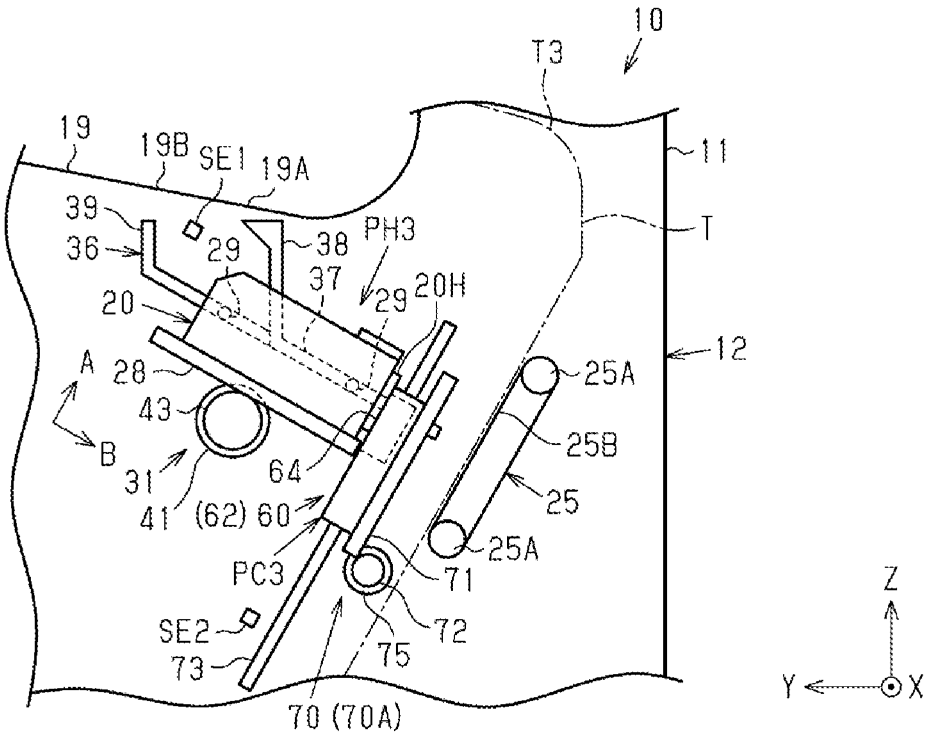
FIG. 15 is a schematic front view illustrating the recording portion and the first maintenance portion when an error occurs.

Next, a recovery operation when an error such as a jam error occurs is described with reference to FIGS. 15 to 17. As illustrated in FIG. 15, when an error such as a jam error occurs, the recording device 10 is brought to an emergency stop, and thus the recording head 20H and the cap 64 may be in contact with each other in an abnormal state other than the capping state. FIG. 15 is an example of the abnormal state other than the capping state, this state may not necessarily occur, and other abnormal states may occur. However, when an error such as a jam error occurs, the control portion 100 is reset, and thus a count value of each of the counters 111 to 114 and position data PD are also reset. Thus, the recording portion 20, the first maintenance portion 60, and the second maintenance portion 80 are in an unidentified state in which the self-positions thereof cannot be recognized. In the unidentified state, the positions of the recording portion 20, the first maintenance portion 60, and the second maintenance portion 80 may not be identified, or even when the positions can be identified, reliability of the identified positions is low. Thus, as illustrated in FIG. 15, an abnormal state in which the recording head 20H and the cap 64 are in contact with each other, or an abnormal state in which the recording head 20H and the wiper member 81 are in contact with each other may occur.

As illustrated in FIG. 16, when the unidentified state occurs, the control portion 100 first causes the recording portion 20 to retreat from a position at the time of occurrence of the error illustrated in FIG. 15 to the retreated position PH1 illustrated in FIG. 16. Then, the control portion 100 causes the first maintenance portion 60 to retreat from the position at the time of occurrence of the error illustrated in FIG. 16 to the retreated position PC1 illustrated in FIG. 17. Further, as described above, the control portion 100 causes the second maintenance portion 80 to retreat to the retreated position PW1 simultaneously with the retreat of the first maintenance portion 60.

Electrical Configuration of Recording Device 10

Next, an electrical configuration of the recording device 10 will be described below with reference to FIG. 18. The recording device 10 receives recording data from a host device (not illustrated), for example. The recording data includes image data of, for example, a CMYK color system that defines recording condition information and recording contents. The recording condition information includes information such as a medium size, a medium type, the presence or absence of the double-sided recording, a recording color, and recording quality. The control portion 100 is electrically connected to a constituent constituting the image reading portion 13 and the recording mechanism 12A. An electrical constituent constituting the recording mechanism 12A includes the recording head 20H, the lift motor 41, the cap portion 62, the first slide motor 75, the wiper portion 82, the second slide motor 87, the gap adjustment motor 49, a pump motor 79, the feeding motor 103, and the transport motor 104. The control portion 100 causes the recording mechanism 12A to perform a recording operation by controlling the electrical constituents.

The control portion 100 performs discharge control to discharge a liquid such as ink from the nozzle N of the recording head 20H by controlling the recording head 20H. The control portion 100 performs movement control to move the recording portion 20 in the first direction B via the first movement mechanism 31 by controlling the lift motor 41. The control portion 100 performs movement control to move the cap portion 62 in the second direction A through the second movement mechanism 70 by controlling the first slide motor 75. The control portion 100 performs movement control to move the wiper portion 82 in the third direction X through the third movement mechanism 83 by controlling the second slide motor 87.

Furthermore, the control portion 100 adjusts the recording position PH4, at which the recording head 20H performs recording, by controlling the gap adjustment motor 49 that is a drive source for rotating the eccentric cam 48. The gap between the medium M and the nozzle surface 20N is adjusted according to a type of the medium M, in which a thickness or the like of the medium M is different, by adjusting the recording position PH4 of the recording head 20H. Further, the control portion 100 controls the pump motor 79 that is a drive source of a pump 78 (refer to FIG. 10) coupled to the cap 64 through a pipe 77, and thus controls cleaning performed by creating a negative pressure inside the cap 64 in the capping state illustrated in FIG. 9. The cleaning is not limited to decompression cleaning in which a liquid such as ink is forcibly discharged from the nozzles N by creating a negative pressure inside the cap 64, and pressure cleaning may be performed. In a configuration in which pressure cleaning is performed, the control portion 100 controls the pump motor 79 to pressurize the liquid reservoir 101 and thus forcibly discharges a liquid such as ink from the nozzle N into the cap 64.

The control portion 100 controls the feeding motor 103 to rotate the pickup roller 21 (refer to FIG. 2), and thus feeds the medium M accommodated in the cassette 15 one sheet at a time. Further, the control portion 100 performs transport control to transport the medium M fed from the cassette 15 along the transport path T by controlling the transport motor 104 to drive the transport roller pairs 22, 23, and 26, and the transport unit 25 (refer to FIG. 2).

Figure 18:
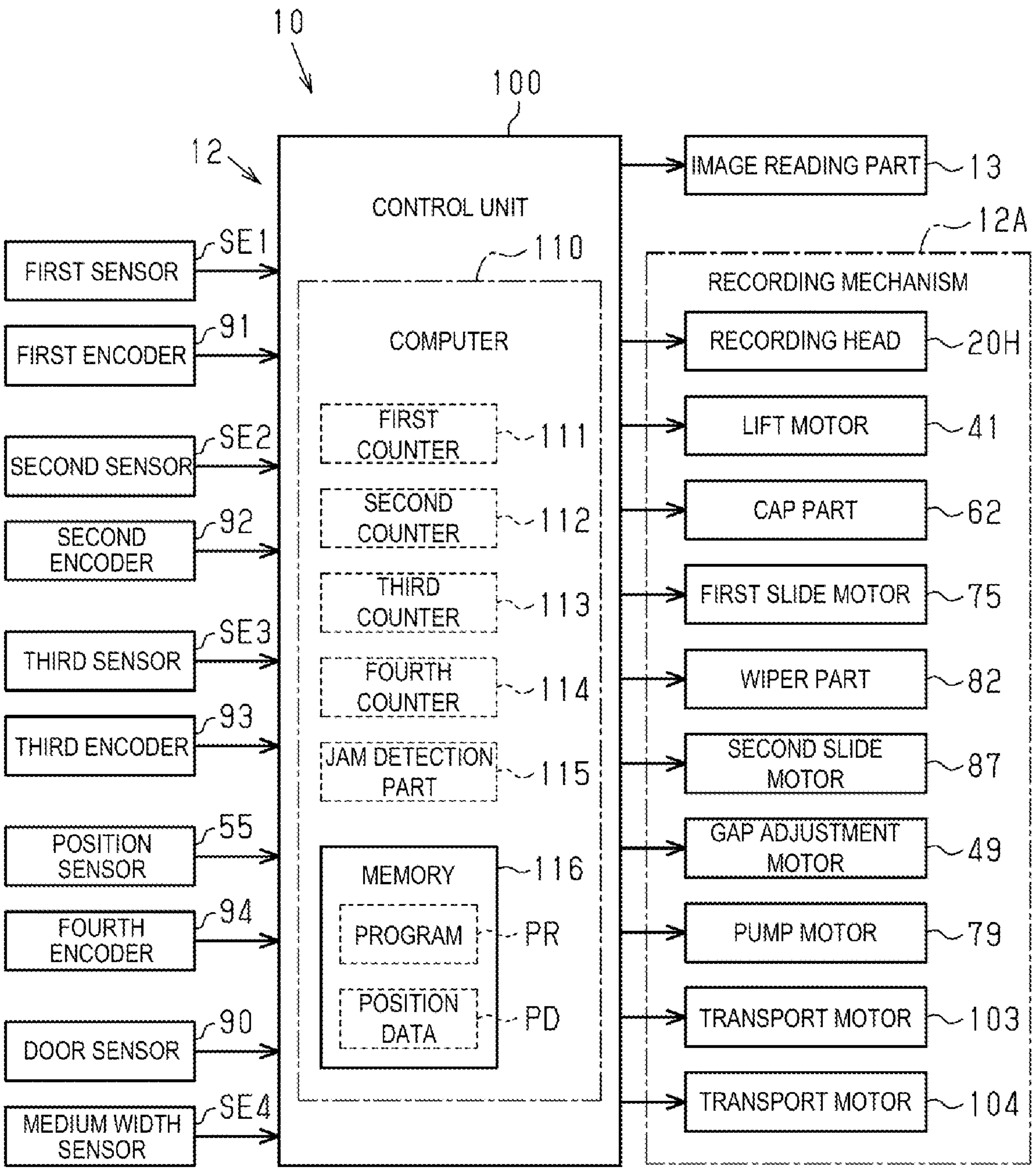
FIG. 18 is a block diagram illustrating an electrical configuration of the recording device.

Further, as illustrated in FIG. 18, the first sensor SE1, the second sensor SE2, the third sensor SE3, a position sensor 55, a door sensor 90, and a medium width sensor SE4 are electrically connected to the control portion 100. Additionally, the control portion 100 is electrically connected to a first encoder 91, a second encoder 92, a third encoder 93, and a fourth encoder 94.

The control portion 100 includes a computer 110. The computer 110 includes a first counter 111, a second counter 112, a third counter 113, a fourth counter 114, a jam detection portion 115, and a memory 116.

The computer 110 of the control portion 100 is configured to include a central processing unit (CPU), a read only memory (ROM), a random access memory (RAM), and a storage. The control portion 100 controls the transport of the medium M in the recording device 10 and the recording operation of information on the medium M by the recording portion 20. Specifically, the control portion 100 is not limited to performing software processing on all of the processes performed by itself. The control portion 100 may include a dedicated hardware circuit (for example, an application-specific integrated circuit (ASIC)) that performs hardware processing on at least some of the processes performed by itself. That is, the control portion 100 can be configured as one or more processors configured to operate in accordance with a computer program (software), one or more dedicated hardware circuits that performs at least some of various processes, or a circuitry including a combination thereof. The processor includes a CPU and a memory 116 such as RAM and ROM, and the memory 116 stores a program code or a command configured to cause the CPU to perform the process. The memory 116, that is, a computer readable medium includes all kinds of available media accessible by a general purpose or dedicated computer 110.

The first counter 111 counts a value indicating the position of the recording portion 20 with the retreated position PH1 of the recording portion 20 as the origin. The first counter 111 is reset when the first sensor SE detects the recording portion 20 that has reached the retreated position PH1 in the origin searching operation of the recording portion 20. The first counter 111 counts the number of pulse edges of a detection signal input from the first encoder 91, and thus counts a count value corresponding to the position of the recording portion 20 on the movement route in the first direction B with the retreated position PH1 as the origin.

The second counter 112 counts a value indicating the position of the first maintenance portion 60 with the retreated position PC1 of the first maintenance portion 60 as the origin. The second counter 112 is reset when the second sensor SE2 detects the first maintenance portion 60 that has reached the retreated position PC1 in the origin searching operation of the first maintenance portion 60. The second counter 112 counts the number of pulse edges of a detection signal input from the second encoder 92 and thus counts a count value corresponding to a position of the first maintenance portion 60 on the movement route in the second direction A with the retreated position PC1 as the origin.

The third counter 113 counts a value indicating the position of the second maintenance portion 80 with the retreated position PW1 of the second maintenance portion 80 as the origin. The third counter 113 is reset when the third sensor SE3 detects the second maintenance portion 80 that has reached the retreated position PW1 in the origin searching operation of the second maintenance portion 80. The third counter 113 counts the number of pulse edges of a detection signal input from the third encoder 93 and thus counts a count value corresponding to the position of the second maintenance portion 80 on the movement route in the third direction X with the retreated position PW1 as the origin.

The fourth counter 114 counts a value indicating a rotational position of the eccentric cam 48 with a predetermined rotational position as the origin. The fourth counter 114 is reset when the position sensor 55 detects the eccentric cam

48 that has reached an origin angle in the origin searching operation of the eccentric cam 48 that adjusts the recording position PH4. The fourth counter 114 counts the number of pulse edges of a detection signal input from the fourth encoder 94 and thus counts a count value corresponding to the rotational position (the rotational angle) of the eccentric cam 48 with the origin angle as the origin.

The jam detection portion 115 detects the presence or absence of the jam of the medium M on the transport path T. The jam detection portion 115 monitors a load of the feeding motor 103 and the transport motor 104 during transportation, and detects the jam of the medium M with the load of any one of the motors 103 and 104 exceeding a predetermined threshold. When the jam detection portion 115 detects the jam, the control portion 100 performs error processing that brings the recording device 10 to an emergency stop as a jam error. The control portion 100 detects various errors other than the jam error and performs error processing in accordance with the detected errors. For example, the recording device 10 is also brought to an emergency stop upon detection of a fatal error such as unplugging of a power supply plug.

The memory 116 stores a program PR and position data PD. The program PR includes a recovery processing routine program illustrated in a flowchart of FIG. 19. When an error such as a jam error is detected and thus the recording device 10 is brought to an emergency stop, the control portion 100 performs the recovery processing by executing a recovery processing routine in order to recover from the error. Further, the control portion 100 stores various types of position data PD corresponding to the count value of each of the counters 111 to 114 in a non-volatile predetermined storage region in the memory 116. Thus, even when the power supply plug of the recording device 10 is unplugged, the position data PD immediately before the power supply is interrupted is stored in a predetermined recording region.

Actions of Embodiments

Next, an action of the recording device 10 which is an example of the liquid discharge device will be described.

A user specifies an image to be recorded and inputs and sets recording condition information by operating a pointing device such as a keyboard or mouse of a host device (not illustrated). The recording condition information includes a medium size, a medium type, a recording color, the number of recording sheets, and the like. The host device transmits a recording operation including the recording condition information and the image data to the recording device 10.

The recording device 10 receives the recording operation from the host device. The control portion 100 drives the pickup roller 21, the roller pairs 22, 23, and 26, and the transport unit 25 based on the recording condition information included in the recording operation. As a result, the recording device 10 feeds the medium M of the specified medium type and medium size from the cassette 15. The fed medium M is transported through the transport path T onto the transport belt 25B. Furthermore, the control portion 100 controls the recording head 20H based on the image data included in the recording operation. The recording head 20H discharges a liquid such as ink toward the medium M transported on the transport belt 25B. The medium M on which recording has been performed is discharged to the discharge tray 19A.

The control portion 100 moves the recording portion 20 from the cap position PH3 to the retreated position PH1. Next, the cap portion 62 is moved from the capping position PC2 to the retreated position PC1. The control portion 100 adjusts a gap between the recording head 20H and the transport belt 25B based on the information of the medium type before the recording is started. The control portion 100 drives the gap adjustment motor 49 to rotate the eccentric cam 48 at a rotational angle corresponding to a gap determined from the medium type.

As illustrated in FIG. 6, when recording is performed, the recording portion 20 moves down from the retreated position, and the plate portion 20A thereof comes into contact with the eccentric cam 48, whereby the recording head 20H is positioned at the recording position PH4. The control portion 100 drives the lift motor 41 normally, and causes the recording portion 20 to move down from the retreated position PH1 until the plate portion 20A comes into contact with a cam surface of the eccentric cam 48 as illustrated in FIG. 5.

As illustrated in FIG. 5, the recording portion 20 is positioned at the recording position PH4 in which the plate portion 20A is brought into contact with the eccentric cam 48. At the recording position PH4, the recording head 20H discharges a liquid from the nozzle N toward the medium M transported by the transport belt 25B. At this time, since the gap between the recording head 20H and the transport belt 25B is adjusted to an appropriate value, recording is performed on the medium M with good recording quality.

After recording is ended, the recording head 20H is in a capping state (FIG. 9) in which the nozzle N is covered with the cap 64. First, the recording portion 20 retreats from the recording position PH4 (FIG. 6) to the standby position PH2 (FIG. 7). The movement is performed by the control portion 100 driving the motor 41 reversely. Next, the control portion 100 moves the cap portion 62 from the retreated position PC1 (FIG. 7) to the capping position PC2 (FIG. 8). The movement is performed by the control portion 100 driving the first slide motor 75 normally. Next, the control portion 100 moves the recording portion 20 from the standby position PH2 (FIG. 8) to the cap position PH3 (FIG. 9). The movement in the capping process is performed by the control portion 100 driving the lift motor 41 normally. In the capping state, the recording head 20H is pressed against the cap 64 with an appropriate cap pressure. Drying of a liquid such as ink in the nozzle N is effectively suppressed under the capping state.

In addition, when cleaning, a closed space surrounded by the nozzle surface 20N and the cap 64 in the capping state is reduced to a required negative pressure, and thus cleaning in which the liquid is forcibly discharged from the nozzle N is appropriately performed. The cleaning is not limited to a configuration in which the inside of the cap 64 is decompressed, and may have, for example, a configuration in which the liquid in the liquid reservoir 101 (refer to FIG. 2) is pressurized on the upstream side of the nozzle N and the liquid is forcibly discharged from the nozzle N.

Further, the control portion 100 manages a flushing time during recording. When the flushing time is reached during recording, the control portion 100 performs flushing on the recording head 20H. When recording on the medium M is ended when the flushing time is reached, the transport of the subsequent medium M is temporarily stopped. First, the recording portion 20 is moved from the recording position PH4 illustrated in FIG. 6 to the standby position PH2 illustrated in FIG. 7. Next, the cap portion 62 is moved in the +A direction from the retreated position PC1 to the capping position PC2. Furthermore, a position in which the recording portion 20 is slightly moved down from the standby position PH2 may be set as a flushing position. Then, the recording head 20H performs flashing in which the liquid is discharged from the nozzle N toward the cap 64. As a result, thickening ink, air bubbles, and the like in the nozzle N are discharged together with a liquid such as ink, and the clogging of the nozzle N is eliminated or prevented. Therefore, recording is performed on the medium M with high recording quality by the recording head 20H.

Incidentally, a jam error that the medium M is jammed in the middle of the transport path T may occur during recording. The control portion 100 monitors the load of the feeding motor 103 and the transport motor 104 during transportation, and detects the jam of the medium M with the load of any one of the motors 103 and 104 exceeding a predetermined threshold. When the jam is detected, the control portion 100 brings the recording device 10 to an emergency stop as the jam error. In addition, even in a case other than the jam, an error also occurs when the power supply plug (not shown) of the recording device 10 is unplugged while the power is on or during the recording operation. When such a type of error occurs, the position of the recording portion 20 that can be acquired by the control portion 100 may be unidentified, and the position may be inaccurate even when the position can be acquired.

A notification indicating the occurrence of jam and an instruction to resolve the jam are displayed on the display portion 14A. For example, the user opens the cover door 16 to expose the transport path T, and removes the jammed medium M. When the door sensor 90 detects that the cover door 16 is opened, the control portion 100 activates an interlock. Then, when the user who has resolved the jam closes the cover door 16 and all the cover doors 16 to 18 are closed, the door sensor 90 is in a detection state. When the door sensor 90 is in the detection state, the control portion 100 releases the state in which the interlock is activated. When an error such as this kind of jam error that one of the cover doors 16 to 18 is opened occurs, the control portion 100 resets the count values of the counters 111 to 114 and the position data PD in the memory 116. On the other hand, when an error that none of the cover doors 16 to 18 can be opened occurs, the control portion 100 holds the count values of the counters 111 to 114 and the position data PD in the memory 116.

Figure 19:
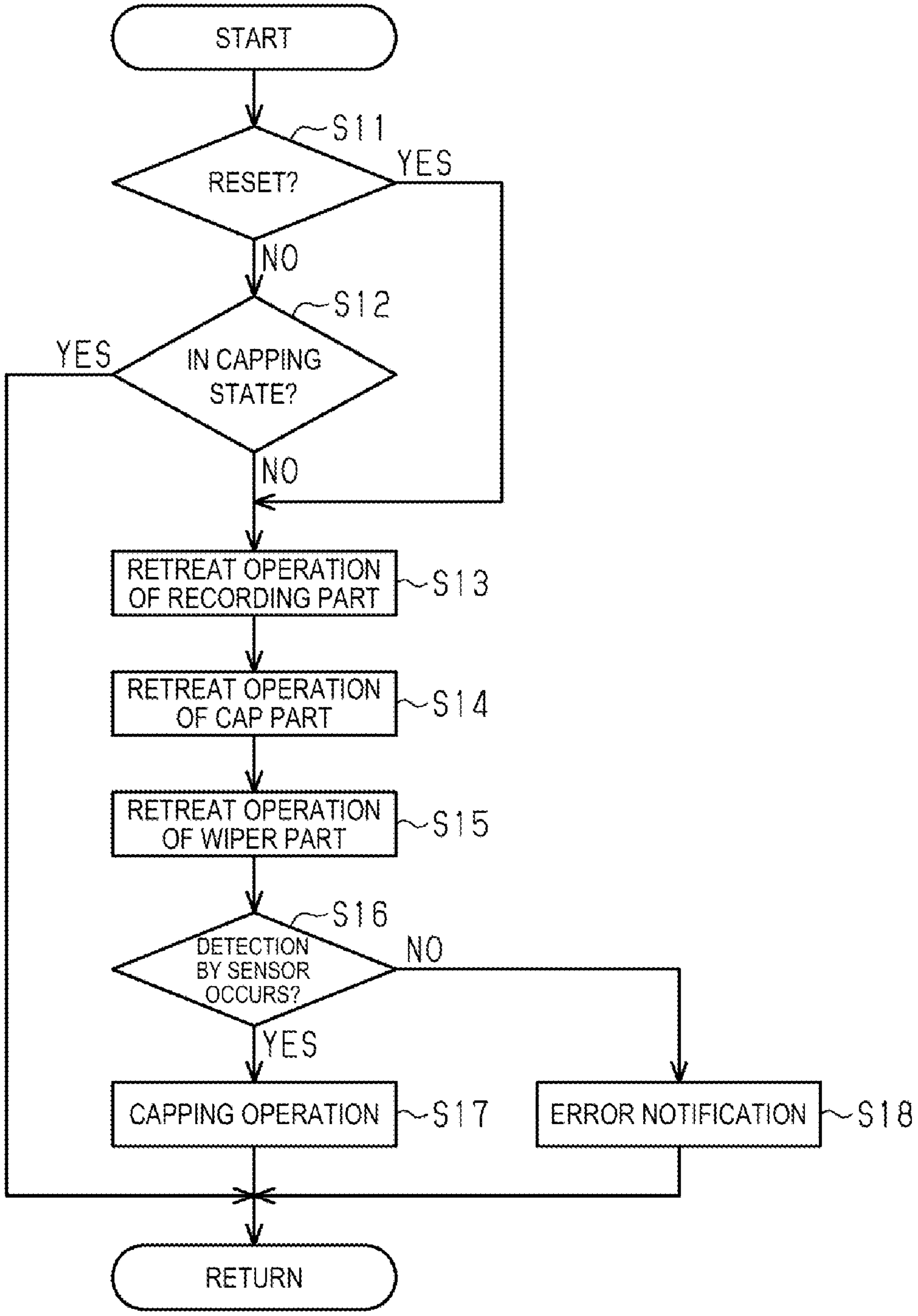
FIG. 19 is a flowchart illustrating a recovery process.

When the detection by the door sensor 90 occurs or it is detected that the operation of the operation portion 14 has been received and the error has been resolved, the control portion 100 performs the recovery processing in the flowchart illustrated in FIG. 19. The recovery processing when an error occurs will be described below with reference to FIG. 19. When the error occurs, the count value of the counters 111 to 114 and the position data PD of the memory 116 may be reset as in the case of the jam error, and may not be reset even in the case of an error that causes an emergency stop. In the case of the error that is not reset, the control portion 100 can recognize the current positions of the recording portion 20, the cap portion 62, and the wiper portion 82 from the count values of the counters 111 to 114 or the position data PD of the memory 116. However, in the case of the error that causes the emergency stop of the recording device 10, the positions of the recording portion 20, the first maintenance portion 60, and the second maintenance portion 80 are unidentified. The position of the recording position PH4 when the gap is adjusted according to the medium type becomes unidentified by the reset of the fourth counter 114.

First, in Step S11, the control portion 100 determines whether or not resetting is performed. When the resetting is performed, the process proceeds to Step S13. On the other hand, when the resetting is not performed, the process proceeds to Step S12.

In Step S12, the control portion 100 determines whether or not it is in the capping state. When it is in the capping state, the routine ends. At this time, as illustrated in FIG. 9, the cap 64 is held in the capping state in which the recording head 20H is capped. On the other hand, when it is not in the capping state, the process proceeds to Step S13.

In Step S13, the control portion 100 performs a retreat operation of the recording portion 20. The control portion 100 causes the recording portion 20 to retreat from the position at the time of the occurrence of the error toward the retreated position PH1 by driving the lift motor 41 reversely. Due to the retreat operation, the recording portion 20 moves to the retreated position PH1 illustrated in FIG. 16.

In Step S14 next, the control portion 100 performs the retreat operation of the cap portion 62. The control portion 100 causes the cap portion 62 to retreat from the position at the time of the occurrence of the error to the retreated position PC1 by driving the first slide motor 75 normally. Due to the retreat operation, the cap portion 62 moves to the retreated position PC1 illustrated in FIG. 17.

In Step S15, the control portion 100 performs the retreat operation of the wiper portion 82. The control portion 100 causes the cap portion 62 to retreat from the position at the time of the occurrence of the error toward the retreated position PW1 by driving the second slide motor 87 reversely. Due to the retreat operation, the wiper portion 82 moves to the retreated position PW1 illustrated in FIGS. 11, 12, and 14. In the embodiment, the control portion 100 performs the retreat operation of the wiper portion 82 in Step S15 simultaneously with the retreat operation of the cap portion 62 in Step S14. However, it is rare for both the cap portion 62 and the wiper portion 82 to be located in the overlapping region OA illustrated in FIG. 14. When one of the cap portion 62 and the wiper portion 82 is located in the overlapping region OA, one of the cap portion 62 and the wiper portion 82 moves from the overlapping region OA to the retreated position outside the overlapping region OA due to the processes of Steps S14 and S15.

In Step S16, it is determined whether the detection by the sensors SE1 to SE3 has occurred. The recording portion 20, the cap portion 62, and the wiper portion 82 move to the retreated positions PH1, PC1, and PW1, and are thus detected by the sensors SE1 to SE3, respectively. When the recording portion 20, the cap portion 62, and the wiper portion 82 are detected by the sensors SE1 to SE3, the origin searching operation is performed. In Step S16, the control portion 100 determines whether or not the origin searching operation for each of the recording portion 20, the cap portion 62, and the wiper portion 82 has been performed. When the detection by all of the sensors SE1 to SE3 has occurred, the process proceeds to Step S17. On the other hand, when a predetermined time elapses and none of the sensors SE1 to SE3 has detected anything, the process proceeds to Step S18.

In Step S17, the control portion 100 performs a capping operation. Specifically, the control portion 100 first moves the recording portion 20 in the +A direction from the retreated position PH1 illustrated in FIG. 17 to the standby position PH2 illustrated in FIG. 7. Next, the control portion 100 moves the cap portion 62 from the retreated position PC1 illustrated in FIG. 7 to the capping position PC2 illustrated in FIG. 8. Furthermore, the control portion 100 moves the recording portion 20 in the +A direction from the standby position PH2 to the cap position PH3. Thus, the recording head 20H is capped with the cap 64.

On the other hand, in Step S18, the control portion 100 performs an error notification. Specifically, the control portion 100 displays the occurrence of an error on the display portion 14A.

Effects of Exemplary Embodiment

According to the embodiment described above, the following effects can be obtained.

(1) The recording device 10 includes a recording portion 20 that performs recording on the medium M, a first maintenance portion 60, a first movement portion 31 that moves the recording portion 20, a second movement portion 70 that moves the first maintenance portion 60, and a control portion 100. The recording portion 20 has a nozzle surface 20N that opens a nozzle N, and discharges a liquid from the nozzle N. The first maintenance portion 60 performs maintenance of the recording portion 20. The first movement portion 31 moves the recording portion 20 in a first direction B that intersects the nozzle surface 20N. The recording portion 20 is movable to a recording position PH4 at which recording is performed on a medium, and a first retreated position PH1 where the recording portion is retreated from the recording position PH4, and the first maintenance portion 60 is movable to a maintenance position at which maintenance of the nozzle surface 20N is performed, and a second retreated position PC1 where the recording portion is retreated from the maintenance position, and the second movement portion 70 moves the first maintenance portion 60 in a second direction A along the nozzle surface 20N. The control portion 100 controls operations of the first movement portion 31 and the second movement portion 70. When an error occurs, the control portion 100 causes the recording portion 20 to retreat away from the first maintenance portion 60 in the first direction B. After the recording portion 20 retreats, the first maintenance portion 60 is caused to retreat in the second direction A. According to such a configuration, before the first maintenance portion 60 starts moving, the recording portion 20 moves away from the first maintenance portion 60 in the first direction B, and thus interference between the first maintenance portion 60 and the recording portion 20 can be prevented, and damage to the recording portion 20 can be prevented.

Specifically, the error is a jam error that a medium jam occurs, or an error that the position of the recording portion becomes unidentified, such as when a power cutoff error occurs, like when a power supply plug is unplugged while power of the recording device is on.

(2) The recording device 10 includes a first sensor SE1 configured to detect the recording portion 20 located at the first retreated position PH1, and a second sensor SE2 configured to detect the first maintenance portion 60 located at the second retreated position PC1. The first sensor SE1 is configured to detect the recording portion 20 located at the first retreated position PH1. The second sensor SE2 is configured to detect the first maintenance portion 60 located at the second retreated position PC1. The control portion 100 detects that the recording portion 20 and the first maintenance portion 60 are respectively located at the first retreated position PH1 and the second retreated position PC1 based on detection results of the first sensor SE1 and the second sensor SE2. According to this configuration, the recording portion 20 and the first maintenance portion 60 can detect self-positions at the retreated positions PH1 and PC1 by moving in a retreat direction. Therefore, the self-positions can be detected while interference between the first maintenance portion 60 and the recording portion 20 is avoided, and a recovery operation can be accelerated. For example, in the case of a configuration in which there is a detection position at which the self-position can be detected in a direction opposite to the retreated position PH1 with respect to the recording position PH4, the retreat operation and the self-position detection operation need to be separately performed, and the recovery operation is delayed accordingly. On the other hand, since there is a detection position capable of detecting the self-position in the same direction as the retreated position PH1 with respect to the recording position PH4, the recovery operation can be accelerated while the interference between the first maintenance portion 60 and the recording portion 20 is avoided.

(3) A region in which the recording portion 20 is movable is referred to as a first movement region MA1, a region in which the first maintenance portion 60 is movable is referred to as a second movement region MA2, and a region in which the first movement region MA1 and the second movement region MA2 overlap is referred to as an interference region IA, and at this time, the first sensor SE1 and the second sensor SE2 can detect the recording portion 20 and the first maintenance portion 60 located outside the interference region IA. According to this configuration, since the first sensor SE1 and the second sensor SE2 are outside the interference region IA, it is possible to reduce the risk that the sensors SE1 and SE2 erroneously recognize the recording portion 20 and the first maintenance portion 60.

(4) In a state in which the recording portion 20 is detected by the first sensor SE1 and the first maintenance portion 60 is detected by the second sensor SE2, the recording portion 20 is entirely outside the interference region IA, and the entire first maintenance portion 60 is outside the interference region IA. According to this configuration, since the recording portion 20 and the first maintenance portion 60 are reliably outside the interference region IA, when one of the recording portion 20 and the first maintenance portion 60 is moved into the interference region IA, it is possible to reduce the risk of collision with the other.

(5) The first maintenance portion 60 is a cap portion 62 that comes into contact with the nozzle surface 20N and performs capping. The cap portion 62 includes a cap 64 which is an example of a contact portion that comes into contact with the nozzle surface 20N, and a spring 65 that is an example of a biasing portion that biases the cap 64 toward the nozzle surface 20N. The cap 64 is supported by the spring 65. According to this configuration, the nozzle surface 20N can be reliably capped by adopting a structure in which the cap portion 62 is biased by the spring 65. In addition, in this case, even when the recording portion 20 is operated in a direction in which the recording portion 20 retreat from the recording position PH4, there is a possibility that the cap portion 62 is in contact with the nozzle surface 20N for a while. When the recording portion 20 and the cap portion 62 are caused to retreat simultaneously in this state, the cap portion 62 may rub against the nozzle surface 20N. In this case, not only the nozzle surface 20N is damaged, but also a load in an unexpected direction is applied to the cap 64, and the cap 64 may be damaged. Thus, the risk of damage to the nozzle surface 20N and the cap 64 can be reduced by moving the cap portion 62 after the retreat of the recording portion 20 starts.

(6) The recording portion 20 is separated from the first maintenance portion 60 located at the maintenance position in a state in which the recording portion 20 is detected by the first sensor SE1. The control portion 100 causes the first maintenance portion 60 to retreat after the recording portion 20 is detected by the first sensor SE1. According to this configuration, it is possible to reduce the risk of damage to the recording portion 20 and the nozzle surface 20N by starting the movement of the cap portion 62 in a retreat direction after the recording portion 20 has moved to the retreated position PH1 outside the interference region IA.

(7) The first maintenance portion 60 is a cap portion 62 that comes into contact with the nozzle surface 20N and performs capping. When the recording portion 20 and the first maintenance portion 60 are detected by the first sensor SE1 and the second sensor SE2, the control portion 100 performs capping of the recording portion 20 with the cap portion 62. According to this configuration, since the cap portion 62 performs the capping immediately after the self-position is detected, it is possible to prevent drying of the nozzle surface 20N.

(8) The recording device 10 includes a transport path T through which a medium M on which recording is performed by the recording portion 20 is transported, and a jam detection portion 115 that detects the presence or absence of jam of the medium M on the transport path T. When the cap portion 62 is located at the capping position PC2, the cap portion 62 is separated from the transport path T. When the recording portion 20 and the first maintenance portion 60 are detected by the first sensor SE1 and the second sensor SE2, the control portion 100 performs capping of the recording portion 20 with the cap portion 62 even when the jam detection portion 115 determines that there is a jam. According to this configuration, when the jam occurs, the nozzle surface 20N is not capped and is exposed until the medium M is removed. As a result, drying of the nozzle surface 20N becomes remarkable. Therefore, here, when the jam occurs, capping is performed even before the jam is resolved. Thus, drying of the nozzle surface 20N is suppressed.

(9) The recording device 10 includes a second maintenance portion 80 that is movable in a third direction X orthogonal to the first direction B and the second direction A and performs maintenance of the recording portion 20, and a third movement portion 83 that moves the second maintenance portion 80 in the third direction X. The control portion 100 can also control the third movement portion 83. A region in which the first maintenance portion 60 is movable is referred to as a second movement region MA2, a region in which the second maintenance portion 80 is movable is referred to as a third movement region MA3, and a region in which the second movement region MA2 and the third movement region MA3 overlap is referred to as an overlapping region OA. At this time, when one of the first maintenance portion 60 and the second maintenance portion 80 performs the maintenance in the overlapping region OA, the other retreats from the overlapping region OA. When an error occurs, the control portion 100 causes the second maintenance portion 80 to retreat simultaneously with the retreat of the first maintenance portion 60. According to this configuration, the first maintenance portion 60 and the second maintenance portion 80 do not take an operation of interfering with each other. Therefore, it is possible to detect the self-position early due to the simultaneous movement after the recording portion 20 retreats.

Modified Examples

The above-described embodiment may also be modified as modified examples described below. Furthermore, an appropriate combination of the above-described embodiment and the modified examples described below can be a further modified example, and an appropriate combination of the modified example described below can be a further modified example.

Figure 20:
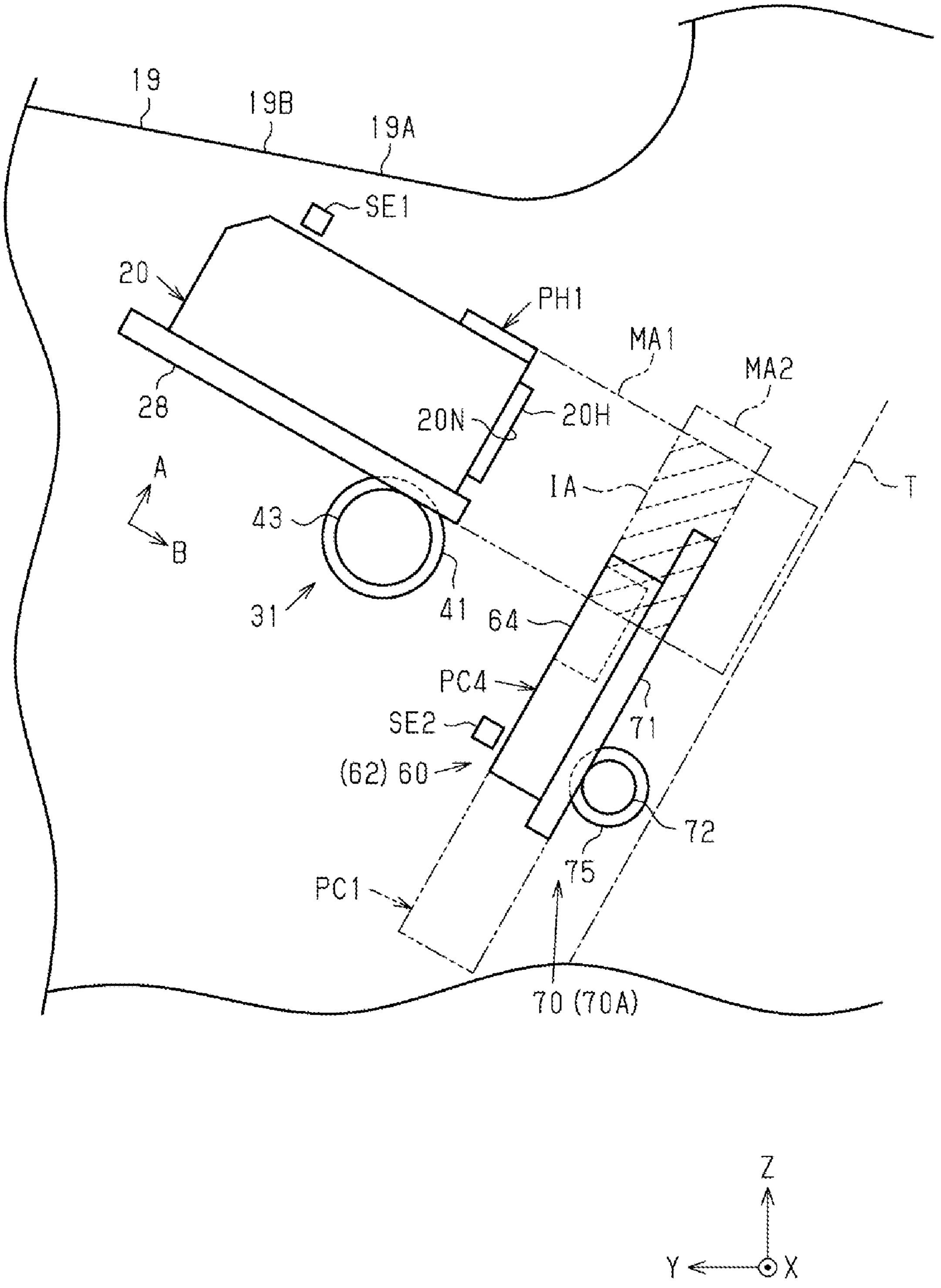
FIG. 20 is a schematic front view for describing a positional relationship between the recording portion and the interference region of the first maintenance portion in a modified example

As illustrated in FIG. 20, the first maintenance portion 60 is a cap portion 62 that comes into contact with the nozzle surface 20N and performs capping. The first maintenance portion 60 performs the capping by coming into contact with the nozzle surface 20N approaching from the outside of the interference region IA in the interference region IA. In a state in which the recording portion 20 is detected by the first sensor SE1, the recording portion 20 is entirely outside the interference region IA, and in a state in which the first maintenance portion 60 is detected by the second sensor SE2, at least a part of the first maintenance portion 60 may be in the interference region IA. In the example of FIG. 20, the recording portion 20 is located at a position PC4 between the capping position PC2 and the retreated position PC1 when the recording portion 20 is detected by the second sensor SE2. According to this configuration, the cap portion 62 can immediately move to the capping position PC2 in the interference region IA at a timing in which the recording portion 20 and the cap portion 62 can recognize the self-positions by the sensors SE1 and SE2. Therefore, compared to a configuration in which the self-position of the cap portion 62 is detected when the entire cap portion 62 is outside the interference region IA, the recording head 20H can be capped with the cap 64 early, and thus drying of the nozzle N that opens to the nozzle surface 20N can be effectively suppressed.

A timing in which movement of the first maintenance portion 60 in the retreat direction that allows a retreat from an error stop position starts is not limited to after the recording portion 20 is detected by the first sensor SE1. For example, the movement of the first maintenance portion 60 in the retreat direction may start before the recording portion 20 is detected by the first sensor SE1. For example, after the movement of the recording portion 20 from the error stop position in the retreat direction starts, a movement distance of the recording portion 20 from the error stop position is measured. When the measured distance reaches a value corresponding to the recording portion 20 reaching a position at which collision with the first maintenance portion 60 can be avoided, the retreat operation of the first maintenance portion 60 may start.

In the embodiment described above, although the first maintenance portion 60 is the cap portion 62, and the second maintenance portion 80 is the wiper portion 82, the first maintenance portion 60 may be the wiper portion 82, and the second maintenance portion 80 may be the cap portion 62.

In the rack and pinion mechanism, a rack is provided on the movable body and a drive gear is provided on the device main body side, or vice versa. That is, the drive gear may be provided on the movable body, and the rack may be provided on the device main body side.

Although the first movement mechanism 31, the second movement mechanism 70, and the third movement mechanism 83 are used the rack and pinion mechanism, other movement mechanisms may be used. For example, a screw mechanism, a belt movement mechanism, or the like may be used.

The recording device 10 according to the embodiment includes two types of the first maintenance portion 60 and the second maintenance portion 80 as movable bodies movable in a direction along the nozzle surface 20N, but may include only the first maintenance portion 60 without the second maintenance portion 80. In this case, the first maintenance portion 60 may be the cap portion 62, or may be the wiper portion 82.

In addition to the first maintenance portion 60 and the second maintenance portion 80, a third maintenance portion may be further provided. The three maintenance portions are configured to move in three different directions along the nozzle surface 20N, for example. For example, when seen in a direction orthogonal to the nozzle surface 20N, the three maintenance portions are configured to be linearly movable along a route passing through a position facing the nozzle surface 20N from different directions by 120 degrees. In addition, a configuration in which one type of maintenance portion can move along a movement route located on the side opposite to the movement route of the recording portion 20 with a linearly arranged recording position therebetween may be employed. In other words, the movement direction may not necessarily be along the nozzle surface 20N for at least M types of maintenance portions (where M is a natural number less than N) among N types of maintenance portions (where N is a natural number of 2 or more). The recording device 10 may be configured to include four or more maintenance portions of different types that are movable in different directions along a route passing through a position facing the nozzle surface 20N.

In the embodiment described above, the recording device 10 includes two types of the first maintenance portion and the second maintenance portion, for example, as moving portions movable in the direction along the nozzle surface 20N, but may be configured to include the first maintenance portion 60 and a moving portion that performs a function other than maintenance function. That is, in addition to the first maintenance portion, a moving portion that performs a function other than the maintenance function may be provided. The moving portion may be, for example, a camera portion that captures the nozzle surface 20N, or may be a sensor unit having a sensor for detecting contamination such as ink on the nozzle surface 20N, and a sensor unit having a sensor for detecting clogging of the nozzle N that opens to the nozzle surface 20N.

The first maintenance portion 60 is not limited to the cap portion 62 or the wiper portion 82. The first maintenance portion 60 may be, for example, a flushing box portion. The first maintenance portion 60 may be a maintenance portion other than them.

The wiper portion 82 includes the blade-shaped wiper member 81, but the wiper member 81 may be formed of cloth. That is, the wiper member 81 may be a cloth wiper.

The control portion 100 may have a software configuration in which a computer such as a CPU executes a program, or may have a hardware configuration using an electronic circuit such as an ASIC. Furthermore, the control portion 100 may be configured by cooperation of software and hardware.

The medium M is not limited to paper and may be a film made of a synthetic resin, a cloth, a nonwoven fabric, a laminated medium, or the like.

The recording device 10 is not limited to an ink-jet recording method. The recording device may be, for example, an ink jet recording type textile printing device.

The recording device 10 is not limited to the ink-jet type, and may be a dot-impact type, a laser type, or an LED electrophotographic type.

The recording device 10 may be a device for discharging other liquids other than ink. For example, the recording device 10 may be a liquid discharge device that discharges a liquid containing a functional material, such as an electrode material or a coloring material (a pixel material) used in manufacture of a liquid crystal display, an electroluminescent (EL) display, and a surface emitting display, or the like, in a dispersed or dissolved form. Further, the recording device 10 may be a liquid discharge device that discharges a bioorganic substance used for biochip manufacturing, or a liquid discharge device that is used as a precision pipette and discharges a sample liquid. Furthermore, the recording device 10 may be a liquid discharge device that discharges a transparent resin liquid such as a thermosetting resin onto a substrate in order to form a minute hemispherical lense (an optical lense) used in an optical communication element and the like, a liquid discharge device that discharges an etchant such as acid or alkali to etch a substrate or the like, or a liquid discharge device that discharges a fluid such as gel (for example, physical gel). In addition, the liquid discharge device may be a 3D printer for a three-dimensional modeling that discharges a light-curable resin liquid in an ink-jet method to form a three-dimensional object. In this way, the recording device 10 is not limited to a device that performs recording on a medium M such as paper, and may be a device that records wiring and circuits on a medium M such as a substrate with ink containing materials thereof.

Hereinafter, technical ideas understood from the above embodiment and modified examples will be described below together with effects.

(A) A recording device includes a recording portion that has a nozzle surface in which a nozzle opens and performs recording on a medium by discharging a liquid from the nozzle, a first maintenance portion that performs maintenance of the recording portion, a first movement mechanism that moves the recording portion in a first direction that intersects the nozzle surface, a second movement mechanism that moves the first maintenance portion in a second direction along the nozzle surface, and a control portion that controls operations of the first movement mechanism and the second movement mechanism, wherein the recording portion is movable to a recording position at which recording is performed on a medium and a first retreated position where the recording portion is retreated from the recording position, the first maintenance portion is movable to a maintenance position at which maintenance is performed on the nozzle surface and a second retreated position where the first maintenance portion is retreated from the maintenance position, and the control portion causes the recording portion to retreat away from the first maintenance portion in the first direction when an error occurs, and causes the first maintenance portion to retreat in the second direction after the recording portion retreats.

According to this configuration, the recording portion moves away from the first maintenance portion in the first direction before the movement of the first maintenance portion starts, and thus interference between the first maintenance portion and the recording portion can be prevented, and damage to the recording portion can be prevented.

(B) In the recording device, a first sensor configured to detect the recording portion located at the first retreated position, and a second sensor configured to detect the first maintenance portion located at the second retreated position may be provided, and the control portion may detect that the recording portion and the first maintenance portion are at the first and second retreated positions, respectively, based on detection results of the first sensor and the second sensor.

According to this configuration, each of the recording portion and the first maintenance portion can detect a self-position at the retreated position by moving in the direction to be retreated. Therefore, the self-position can be detected while interference between the first maintenance portion and the recording portion is avoided, and a recovery operation can be accelerated. For example, when a configuration in which there is a detection position in which the self-position can be detected in a direction opposite to the retreated position with respect to the recording position, it is necessary to perform a retreat operation and a self-position detection operation separately, and thus the recovery operation is delayed. On the other hand, since there is a detection position that can detect the self-position in the same direction as the retreated position with respect to the recording position, the recovery operation can be accelerated while the interference between the first maintenance portion and the recording portion is avoided.

(C) In the recording device, when a region in which the recording portion is movable is referred to as a first movement region, a region in which the first maintenance portion is movable is referred to as a second movement region, and a region in which the first movement region and the second movement region overlap is referred to as an interference region, the first sensor and the second sensor may be configured to detect the recording portion and the first maintenance portion located outside the interference region.

According to this configuration, since the first sensor and the second sensor are outside the interference region, it is possible to reduce a possibility that the sensors erroneously recognize the recording portion and the first maintenance portion.

(D) In the recording device, the first maintenance portion may be a cap portion configured to comes into contact with the nozzle surface to perform capping, the first maintenance portion may perform the capping in the interference region by coming into contact with the nozzle surface approaching from the outside of the interference region, the recording portion may be entirely outside the interference region in a state in which the recording portion is detected by the first sensor, and a part of the first maintenance portion may be within the interference region in a state in which the first maintenance portion is detected by the second sensor.

According to this configuration, when the capping is performed at a timing in which the self-position is recognized by the second sensor, a distance in which the cap portion moves to a capping position in the interference region is relatively shortened. Therefore, it is possible to perform the capping immediately compared to a case in which detection occurs when the entire cap portion is outside the interference region, and thus, drying of the nozzle surface can be prevented.

(E) In the recording device, in a state in which the recording portion is detected by the first sensor and the first maintenance portion is detected by the second sensor, the recording portion may be entirely outside the interference region, and the entire first maintenance portion may be outside the interference region.

According to this configuration, it can be seen that the recording portion and the first maintenance portion are reliably outside the interference region, and thus when one of them moves into the interference region, the risk of collision with the other can be reduced.

(F) In the recording device, the first maintenance portion may be a cap portion configured to come into contact with the nozzle surface to perform capping, and the cap portion may include a contact portion that comes into contact with the nozzle surface, and a biasing portion that biases the contact portion toward the nozzle surface, and the contact portion may be supported by the biasing portion.

According to this configuration, the cap portion is biased by the biasing portion, and thus the nozzle surface can be reliably capped. Also, in this case, even when the recording portion is operated in a direction in which the recording portion retreats from the recording position, the cap portion may be temporarily in contact with the nozzle surface. When the recording portion and the cap portion are intended to retreat simultaneously in this state, there is a possibility that the cap portion may rub against the nozzle surface. In this case, not only the nozzle surface is damaged, but also a load in an unexpected direction is applied to the contact portion, and there is a risk of damage. Thus, it is possible to reduce the risk of damage to the nozzle surface and the contact portion by performing the movement of the cap portion after the retreat of the recording portion starts.

(G) In the recording device, the recording portion may be separated from the first maintenance portion located at the maintenance position in the state in which the recording portion is detected by the first sensor, and the control portion may retreat the first maintenance portion after the recording portion is detected by the first sensor.

According to this configuration, since the movement of the cap portion in a retreat direction starts after the recording portion moves to the retreated position outside the interference region, it is possible to reduce the risk of damage to the recording portion and the nozzle surface.

(H) In the recording device, the first maintenance portion may be a cap portion configured to come into contact with the nozzle surface to perform capping, and the control portion may perform the capping of the recording portion with the cap portion when the recording portion and the first maintenance portion are detected by the first sensor and the second sensor.

According to this configuration, since the capping is performed immediately after the self-position is detected, drying of the nozzle surface can be prevented.

(I) In the recording device, a transport path through which the medium on which recording is performed by the recording portion is transported, and a jam detection portion that detects the presence or absence of a jam of the medium on the transport path may be provided, the cap portion may be separated from the transport path when the cap portion is at a capping position, and when the recording portion and the first maintenance portion are detected by the first sensor and the second sensor, the control portion may perform the capping of the recording portion with the cap portion even when the jam detection portion determines that there is a jam.

According to this configuration, when a jam occurs, the nozzle surface generally remains uncapped and exposed until the medium is removed. As a result, the drying of the nozzle surface becomes remarkable. Therefore, when a jam occurs, the capping is performed even before the jam is resolved. Thus, drying of the nozzle surface is suppressed.

(J) In the recording device, a second maintenance portion that is movable in a third direction orthogonal to the first direction and the second direction and performs maintenance of the recording portion, and a third movement mechanism that moves the second maintenance portion in the third direction may be provided, the control portion may also configured to control the third movement mechanism, when a region in which the first maintenance portion is movable is referred to as a second movement region, a region in which the second maintenance portion is movable is referred to as a third movement region, and a region in which the second movement region and the third movement region overlap is referred to as an overlapping region, and when one of the first maintenance portion and the second maintenance portion performs maintenance in the overlapping region, the other may retreat from the overlapping region, and when an error occurs, the control portion may retreat the second maintenance portion simultaneously with retreat of the first maintenance portion.

According to this configuration, the first maintenance portion and the second maintenance portion do not take an operation of interfering with each other. Therefore, it is possible to detect self-positions thereof early by moving simultaneously after the recording portion retreats.

What is claimed is:

1. A recording device comprising:

a recording portion having a nozzle surface in which a nozzle opens and configured to perform recording on a medium by discharging a liquid from the nozzle;

a first maintenance portion configured to perform maintenance of the recording portion;

a first movement portion configured to move the recording portion in a first direction intersecting the nozzle surface;

a second movement portion configured to move the first maintenance portion in a second direction along the nozzle surface; and a control portion configured to control operations of the first movement portion and the second movement portion, wherein the recording portion is configured to move to a recording position at which recording is performed on a medium and a first retreated position where the recording portion is retreated from the recording position, the first maintenance portion is configured to move to a maintenance position at which maintenance of the nozzle surface is performed and a second retreated position where the first maintenance portion is retreated from the maintenance position, and when an error occurs, the control portion causes the recording portion to retreat away from the first maintenance portion in the first direction and causes the first maintenance portion to retreat in the second direction after the recording portion retreats.

2. The recording device according to claim 1, comprising:

a first sensor configured to detect the recording portion located at the first retreated position; and a second sensor configured to detect the first maintenance portion located at the second retreated position; wherein the control portion detects that the recording portion and the first maintenance portion are respectively at the first retreated position and the second retreated position based on detection results of the first sensor and the second sensor.

3. The recording device according to claim 2, wherein, when a region in which the recording portion is movable is referred to as a first movement region, a region in which the first maintenance portion is movable is referred to as a second movement region, and a region in which the first movement region and the second movement region overlap is referred to as an interference region, the first sensor and the second sensor are configured to detect the recording portion and the first maintenance portion located outside the interference region.

4. The recording device according to claim 3, wherein the first maintenance portion is a cap portion configured to come into contact with the nozzle surface to perform capping, the first maintenance portion performs the capping in the interference region by coming into contact with the nozzle surface approaching from an outside of the interference region, the recording portion is entirely outside the interference region in a state in which the recording portion is detected by the first sensor, and a part of the first maintenance portion is within the interference region in a state in which the first maintenance portion is detected by the second sensor.

5. The recording device according to claim 3, wherein, in a state in which the recording portion is detected by the first sensor and the first maintenance portion is detected by the second sensor, the recording portion is entirely outside the interference region, and the first maintenance portion is outside the interference region.

6. The recording device according to claim 2, wherein the first maintenance portion is a cap portion configured to come into contact with the nozzle surface to perform capping, the cap portion includes a contact portion that comes into contact with the nozzle surface, and a biasing portion that biases the contact portion toward the nozzle surface, and the contact portion is supported by the biasing portion.

7. The recording device according to claim 6, wherein the recording portion is separated from the first maintenance portion located at the maintenance position in a state in which the recording portion is detected by the first sensor, and the control portion causes the first maintenance portion to retreat after the recording portion is detected by the first sensor.

8. The recording device according to claim 2, wherein the first maintenance portion is a cap portion configured to come into contact with the nozzle surface to perform capping, and the control portion is configured to perform the capping of the recording portion with the cap portion when the recording portion and the first maintenance portion are detected by the first sensor and the second sensor.

9. The recording device according to claim 8, comprising:

a transport path through which the medium on which recording is performed by the recording portion is transported; and a jam detection portion configured to detect presence or absence of a jam of the medium on the transport path, wherein the cap portion is separated from the transport path when the cap portion is at a capping position, and when the recording portion and the first maintenance portion are detected by the first sensor and the second sensor and the jam detection portion determines that there is a jam, the control portion performs the capping of the recording portion with the cap portion.

10. The recording device according to claim 1, comprising:

a second maintenance portion configured to move in a third direction orthogonal to the first direction and the second direction and to perform maintenance of the recording portion; and a third movement portion configured to move the second maintenance portion in the third direction; wherein the control portion is also configured to control the third movement portion, the other retreats from an overlapping region when a region in which the first maintenance portion is movable is referred to as a second movement region, a region in which the second maintenance portion is movable is referred to as a third movement region, a region in which the second movement region and the third movement region overlap is referred to as the overlapping region, and one of the first maintenance portion and the second maintenance portion performs maintenance in the overlapping region, and when an error occurs, the control portion causes the second maintenance portion to retreat simultaneously with retreat of the first maintenance portion.

11. The recording device according to claim 1, wherein the error is an error that a position of the recording portion is unidentified.

12. The recording device according to claim 11, wherein the error is an error that a medium jam occurs, or an error that a power supply is interrupted.

13. The recording device according to claim 1, wherein the control portion is configured to cause the first maintenance portion to retreat in the second direction after the recording portion moves toward the retreated position and before the recording portion is located at the retreated position.

14. A control method of a recording device that includes a recording portion having a nozzle surface in which a nozzle opens and configured to perform recording on a medium by discharging a liquid from the nozzle, a first maintenance portion configured to perform maintenance of the recording portion, a first movement portion configured to move the recording portion in a first direction intersecting the nozzle surface to a recording position at which the recording on the medium is performed and a first retreated position where the recording portion is retreated from the recording position, and a second movement portion configured to move the first maintenance portion in a second direction along the nozzle surface to a maintenance position at which maintenance of the nozzle surface is performed and a second retreated position where the first maintenance portion is retreated from the maintenance position, wherein, when an error occurs, the recording portion is caused to retreat away from the first maintenance portion in the first direction, and the first maintenance portion is caused to retreat in the second direction after the recording portion retreats.

15. A control method of a recording device that includes a recording portion having a nozzle surface in which a nozzle opens and configured to perform recording on a medium by discharging a liquid from the nozzle, a first maintenance portion configured to perform maintenance of the recording portion, a second maintenance portion configured to perform the maintenance of the recording portion, the second maintenance portion being different from the first maintenance portion, a first movement portion configured to move the recording portion in a first direction intersecting the nozzle surface to a recording position at which the recording on the medium is performed and a first retreated position where the recording portion is retreated from the recording position, a second movement portion configured to move the first maintenance portion in a second direction along the nozzle surface to a maintenance position at which maintenance of the nozzle surface is performed and a second retreated position where the first maintenance portion is retreated from the maintenance position, and a third movement portion configured to move the second maintenance portion in a third direction orthogonal to the first direction and the second direction, wherein, when an error occurs, the recording portion is caused to retreat away from the first maintenance portion in the first direction, the first maintenance portion is caused to retreat in the second direction after the recording portion retreats, and the second maintenance portion is caused to retreat from a movement region of the first maintenance portion in the third direction simultaneously with retreat of the first maintenance portion.

* * * * *